United States Patent [19]

Ishikawa et al.

[11] Patent Number: 5,815,343
[45] Date of Patent: Sep. 29, 1998

[54] MAGNETIC RECORDING MEDIUM, PROCESS FOR PRODUCING THE SAME AND MAGNETIC RECORDING SYSTEM

[75] Inventors: Akira Ishikawa, Kodaira; Yoshihiro Shiroishi, Hachioji; Yuzuru Hosoe, Hino; Yotsuo Yahisa, Odawara; Tomoo Yamamoto, Hachioji; Masukazu Igarashi, Kawagoe; Akira Osaki, Odawara; Yoshiki Kato, Tokyo; Jun Fumioka, Hadano, all of Japan

[73] Assignee: Hitachi, Ltd., Tokyo, Japan

[21] Appl. No.: 967,346

[22] Filed: Oct. 27, 1997

Related U.S. Application Data

[63] Continuation of Ser. No. 275,391, Jul. 15, 1994, abandoned.

[30] Foreign Application Priority Data

Jul. 22, 1993 [JP] Japan .................................. 5-181015
Sep. 6, 1993 [JP] Japan .................................. 5-221227

[51] Int. Cl.⁶ .......................... G11B 5/012; G11B 17/00; G11B 5/78; G11B 5/82
[52] U.S. Cl. ...................... 360/97.01; 360/134; 360/135; 204/192.15
[58] Field of Search ............................ 360/97.01, 77.05, 360/113, 135, 134; 204/192.15; 428/694 T, 694 TC, 694 TM, 694 TR, 694 TS, 694 TP; 451/41, 57, 63; 257/97

[56] References Cited

U.S. PATENT DOCUMENTS 4,803,577  2/1989  Ezaki et al. .............................. 360/135
4,874,637  10/1989  Miyabashi ............................... 427/131
4,881,143  11/1989  Bhattacharyya et al. ............... 360/113

(List continued on next page.)

FOREIGN PATENT DOCUMENTS 63-13124   1/1988  Japan .
63-34754   2/1988  Japan .
1-211214   8/1989  Japan .
2-177013   7/1990  Japan .
2-198030   8/1990  Japan .
4-195818   7/1992  Japan .

OTHER PUBLICATIONS

S.Wolf, Silicon processing for the VLSI era, vol. II, "Process Integration," pp.75–76 unknown.

T. Yamashita et al., "Sputtered $Ni_xP$ Underlayer for CoPt-Based Thin Film Magnetic Media", *IEEE Transactions on Magnetics*, vol. 27, No. 6, Nov. 1991, pp. 4727–4729.

(List continued on next page.)

*Primary Examiner*—Tom Thomas
*Assistant Examiner*—Adriana Giordana
*Attorney, Agent, or Firm*—Antonelli, Terry, Stout & Kraus, LLP

[57] ABSTRACT

A magnetic recording medium includes a non-magnetic substrate, and a magnetic layer provided on the non-magnetic substrate. The value of the product $Br_1\delta$ of the residual flux density $Br_1$ of the magnetic layer determined in a recording direction and the thickness $\delta$ of the magnetic layer is not less than 5 G$\mu$m and not more than 180 G$\mu$m; the value of the ratio of $Br_1$ to the residual flux density $Br_2$ determined in a direction parallel to the substrate plane and perpendicular to the recording direction, $Br_1/Br_2$, is not less than 1.3 and not more than 3; the surface of the non-magnetic substrate has texture grooves therein extending predominantly in the recording direction; and the average roughness factor Ra of the surface of the magnetic layer determined in a direction perpendicular to the substrate plane and perpendicular to the recording direction is not less than 0.3 nm and not more than 1.9 nm. Alternatively, the value of the product $Br\delta$ of the residual flux density Br of the magnetic layer determined in the recording direction and the thickness $\delta$ of the magnetic layer is not less than 5 G$\mu$m and not more than 80 G$\mu$m; and the value of the anisotropic magnetic field $H_k$ of the magnetic recording medium is not less than 7 kOe and not more than 20 kOe.

62 Claims, 8 Drawing Sheets

U.S. PATENT DOCUMENTS

| | | | |
|---|---|---|---|
| 4,908,727 | 3/1990 | Ezaki et al. | 360/135 |
| 5,057,200 | 10/1991 | Lal et al. | 204/192.15 |
| 5,094,898 | 3/1992 | Morita et al. | 428/694 |
| 5,119,258 | 6/1992 | Tsai et al. | 360/135 |
| 5,156,919 | 10/1992 | Brar et al. | 360/126 |
| 5,167,096 | 12/1992 | Eltoukhy et al. | 451/63 |
| 5,236,791 | 8/1993 | Yahisa et al. | 428/694 TP |
| 5,246,782 | 9/1993 | Kennedy et al. | 428/421 |
| 5,316,844 | 5/1994 | Suzuki et al. | 428/694 TP |
| 5,325,244 | 6/1994 | Takano et al. | 360/77.05 |
| 5,328,740 | 7/1994 | Nakayama et al. | 428/694 TR |
| 5,364,655 | 11/1994 | Nakamura et al. | 427/129 |
| 5,370,928 | 12/1994 | Funabashi et al. | 428/694 T |
| 5,419,938 | 5/1995 | Kagotani et al. | 428/694 BH |
| 5,422,571 | 6/1995 | Gurney et al. | 360/113 |

OTHER PUBLICATIONS

B. Wong et al., "An investigation on the fine defect structure of CoCrTa/Cr magnetic thin films", *Journal of Applied Physics,* vol. 73, No. 1, Jan. 1, 1993, pp. 418–421.

IEEE Transactions on Magnetics, vol. 26, pp. 2271–2776 (1990).

Ibid., vol. 29, pp. 292–299 (1993).

Ibid., vol. 29, pp. 307–316 (1993).

Ibid., vol. Mag–23, pp. 3405–3407 (1987).

MAGNETIC RECORDING MEDIUM, PROCESS FOR PRODUCING THE SAME AND MAGNETIC RECORDING SYSTEM

CROSS-REFERENCE TO RELATED APPLICATION

This is a continuation of application Ser. No. 08/275,391 filed on Jul. 15, 1994, now abandoned.

BACKGROUND OF THE INVENTION

The present invention relates to a magnetic recording medium, such as a magnetic recording drum, magnetic recording tape, magnetic recording disk and magnetic recording card and to a magnetic recording system which uses the same. In more particular, it relates to a magnetic recording medium suited for high density magnetic recording, a process for producing the same and a magnetic recording system which uses the same.

With the recent trend toward smaller-sized and higher speed electronic computers, requirements have been increasing for magnetic recording disk systems and other external storage apparatuses with larger capacity and higher access speed. In particular, since a magnetic recording disk system is an information storage system suited for attaining high density and high speed, the demand therefore is becoming increasingly stronger. Magnetic recording media which have been developed for use in a magnetic recording disk system include a medium comprising a substrate and powders of an oxide magnetic substance coated thereon and a thin film magnetic recording medium comprising a substrate and a thin film of a magnetic metal sputtered thereonto. Of these, the thin film magnetic recording medium has a magnetic recording layer containing a magnetic substance in a higher density than in the coated media, so that it is suited for high density recording and read back. Substrates generally used in thin film magnetic recording media are those of Al alloys (e.g., Al—Mg alloy), chemically strengthened glass, organic toughened glass, organic resin, ceramics, etc. which have a Ni—P plated layer formed on the surface. The substrate surface further has, for the purpose of preventing head sticking and improving magnetic properties, grooves and protrusions of about 2 nm to 10 nm in terms of surface average roughness factor, R, which are called textures, formed thereon, as described, for example, in IEEE Trans. Mag., vol. MAG-23, pp. 3405 (1987).

Further, a dual head with an inductive head for writing and a magnetoresistive head for reading (hereinafter abbreviated as MR head or dual head) has been developed which uses a magnetoresistive effect type (hereinafter abbreviated as MR) sensor in the reading part of a magnetic head thereby to improve the read back efficiency of the head as compared with previous inductive magnetic heads. By using this head, a sufficient signal/noise (S/N) ratio can be obtained even with recorded bits of small area, and hence the recording density of a magnetic recording medium can be greatly improved.

On the other hand, the read output of solitary waves recorded in low density in a magnetic recording medium is approximately proportional to the product, $Br_1\delta$, of the residual flux density (hereinafter abbreviated as $Br_1$) of the magnetic layer measured in the recording direction and the total layer thickness (hereinafter abbreviated as $\delta$) of the magnetic layer. The recording direction is a magnetic head travel direction, which is a direction a magnetic head travels relative to a magnetic recording medium during recording and/or reading as a result of relative motion occurring between the magnetic head and the magnetic recording medium. The relative motion between the magnetic head and the magnetic medium occurs as a result of the magnetic recording medium being driven by a magnetic recording medium driving part. For a disk-shaped magnetic recording medium, the recording direction or the head travel direction is a circumferential direction of the magnetic recording medium. To attain a surface recording density of 150 Mb/in² by using an inductive magnetic head, for example 330 G$\mu$m (2.6 memu/cm²) is suitable as the $Br_1\delta$ of a magnetic recording medium. When an MR head having a higher efficiency than inductive magnetic heads is used, however, it is suitable to decrease the $Br_1\delta$ from that used previously. For example, it is described in IEEE Trans. Mag., vol. 26, pp. 2271 (1990) that a $Br_1\delta$ of about 90 G$\mu$m (0.7 memu/cm²) is suitable for attaining a surface recording density of 1 Gb/in². The magnetic properties of this magnetic recording medium are isotropic in the substrate plane, and the residual flux density, $Br_1$, measured in the disk circumference direction (i.e., recording direction) is equal to the residual flux density (hereinafter abbreviated as $Br_2$) measured in the disk radius direction (i.e., direction perpendicular to the recording direction).

To increase recording density, development of an MR head having a high read back efficiency is indispensable, and further a magnetic recording medium adapted for an MR head is necessary.

The use of an MR head has a problem in that when the $Br_1\delta$ of a magnetic recording medium is too large, the magnetization of an MR film becomes unstable owing to its excessive rotation, which causes generation of Barkhausen noise from the head and makes it unusable. It also has a problem in that the waveform of the read back signal of the positive side and that of the negative side become asymmetric and resultantly the differentiation of signals becomes difficult.

Thus, a magnetic recording medium having an appropriate $Br_1\delta$ is required.

Further, when the linear recording density is increased to 100 kBPI (kilo Bits Per Inch) or more and the spacing between the transition regions of magnetization of the medium (i.e., bit spacing) becomes about 300 nm or less, in a prior magnetic recording medium having isotropic magnetic properties the magnetic interference between magnetization transition regions becomes strong and the leakage flux that flows from the magnetic recording medium into the head as read back signals drastically decreases. This brings about a problem in that a high S/N ratio cannot be obtained even when the efficiency of an MR head is increased.

Accordingly, a magnetic recording medium is required which has a magnetization transition region of a smaller width than previously so that the output from the recording medium may not decrease even when the linear recording density is increased.

Further, when the recording track density of a magnetic recording medium is increased to 3.5 kTPI (kilo Tracks Per Inch) or more, since a prior magnetic recording medium having isotropic magnetic properties shows a large residual flux density in the track width direction, the side-writing in the track width direction becomes insufficient and, when the track width of the MR head is small, a sufficient recording track width cannot be secured. When the track width of the MR head is increased in such a case, the alignment of the writing head magnetic pole and the MR sensor becomes difficult in producing the head; moreover it causes a problem in that, when the head is seeked by using a rotary actuator, the position of a track recorded when the head slider direction inclined from the track direction (recording direction) and the position read by the MR head shift from each other in the track width direction, resulting in insufficient read back signals and a wide efficiency distribution of the MR head.

Therefore, a magnetic recording medium is required which can secure a sufficient effective recording track width even when the track width of the MR head is small, and gives a larger width of side-writing band than before in the track width direction.

A dual head has newly been developed which is still more improved in read back efficiency of the head than the prior inductive magnetic head by using a giant magnetoresistive effect type (hereinafter abbreviated as GMR) sensor in the reading part of the magnetic head (said new head being hereinafter abbreviated as GMR head). By using the GMR head, a sufficient signal to noise ratio can be obtained even when the area of recorded bits is small, so that the recording density of a medium can be drastically improved.

The magnetic layer mainly used at present is a Co alloy sputtered film having a high saturation flux density (hereinafter referred to as Bs). The Co alloy has a hexagonal closed packed (hcp) crystal structure and its axis of easy magnetization is the c-axis of the crystal. Accordingly, in an in-plane recording system the crystal must be grown in an orientation such that the c-axis may become parallel to the substrate plane. A technique is in use for this purpose wherein a Cr film or an alloy film of Cr—Ti or Cr—V having a body centered cubic (bcc) structure is used as the underlayer and a Co alloy thin film is epitaxially grown thereon.

The magnetic properties of prior magnetic layers are, as described for example in IEEE Trans. Mag., vol. 29, pp. 307 (1993), as follows: The product (Brδ) of the residual flux density of the magnetic layer determined in the recording direction (hereinafter abbreviated as Br) and the total layer thickness (δ) of the magnetic layer is about 80–180 G$\mu$m and the coercivity (Hc) determined in the recording direction is about 1600–2100 Oe.

There is also described in IEEE Trans. Mag. vol. 29, pp. 292 (1993) the result of analysis made, by the observation of magnetic layers with a transmission electron microscope, on the crystal grain boundary, orientation of the c-axis, the presence of a different phase having a face centered cubic (fcc) lattice type crystal structure, the density of stacking faults, etc.

For improving the recording density further hereafter, it is essential to develop a GMR head having a high read back efficiency and to develop a recording medium which has magnetic properties adapted for GMR heads and has a surface more smoothened than before to decrease the flying height of the head.

The present inventors have made recording and reading experiments by using a recording medium of the prior art and a GMR head and obtained the following results. The Brδ was 80 G$\mu$m or more and, when read back was conducted with a GMR head, noise was greatly increased with the increase of output and a high S/N ratio could not be obtained. Further, when the Brδ was large, the output of the GMR head reached saturation and the waveform of the read back signal of the positive side and that of the negative side became asymmetric, resulting in difficult differentiation of signals. A large Brδ of the medium caused another problem in that the magnetization of the GMR film rotates excessively and becomes unstable, causing the generation of Barkhausen noise from the head and resulting in occurrence of recorded bit errors.

It is effective for solving these problems to decrease the Brδ of the medium to 80 G$\mu$m or less. For this purpose, the layer thickness δ of the magnetic layer or the residual flux density Br must be reduced. However, when the Brδ was reduced to said value by either of these methods, the coercivity, Hc, of the medium lowered markedly, as compared with the prior art media, to 1000 Oe or less. Such lowering of Hc caused a marked lowering of head output in a high recording density region of a linear recording density of 100 kBPI or more, resulting in occurrence of errors.

In the media of the prior art described above, a technique comprising isolation of magnetic layer crystal grains has been proposed based on the idea that lowering of interaction among the grains of the magnetic layer would be effective for reducing medium noise. However, this technique causes the lowering of output at high recording density that accompanies the decrease of coercive squareness (S*) and the lowering of corrosion resistance of the magnetic layer.

For effective detection of magnetic flux from a medium with a GMR head, the flying height of the head should be 0.1 $\mu$m or less. However, prior media have textures of an Ra of 2 nm or more formed on the substrate surface with the object of preventing head sticking or improving magnetic properties, so that when the flying height is decreased the protruded part of the texture and the head are apt to contact with each other, and hence the flying height cannot be decreased to 0.1 $\mu$m or less. Accordingly, a medium which has a more smooth surface than previous ones must be formed so that the head may be able to fly stably.

SUMMARY OF THE INVENTION

The first object of the present invention is to provide a magnetic recording medium which is adapted for MR heads having a high read back efficiency and gives a large width of side-writing band and a high S/N ratio.

The second object of the present invention is to provide a process for producing a magnetic recording medium which is suited for producing such a magnetic recording medium with good reproducibility.

The third object of the present invention is to provide a magnetic recording system having a large capacity and a high reliability which uses such a magnetic recording medium.

The fourth object of the present invention is to provide a recording medium which is adapted for a GMR head having a high read back efficiency and can give a high S/N ratio, that is, a magnetic recording medium which can give an S/N ratio of 1 or more in recording and reading at a linear recording density of 150 kBPI or more and a track density of 10 kTPI or more (corresponding to a surface recording density of 1.5 Gb/in$^2$ or more) and at a flying height of the GMR head of 0.1 $\mu$m or less.

The fifth object of the present invention is to provide a process for producing such a medium with good reproducibility.

The sixth object of the present invention is to provide a large capacity and highly reliable magnetic recording system which uses such a medium.

The present inventors have made extensive study to achieve the aforesaid objects. As the results, it has been found that these objects can be achieved by forming a magnetic layer having specific physical properties on a non-magnetic disk to obtain a magnetic recording medium.

According to the first aspect of the present invention, there are provided a magnetic recording medium having a non-magnetic substrate and a magnetic layer provided onto the non-magnetic substrate, wherein the value of the product $Br_1\delta$ of the residual flux density $Br_1$ of the magnetic layer determined in the recording direction and the total layer thickness $\delta$ of the magnetic layer is not less than 5 G$\mu$m and not more than 180 G$\mu$m, and the value of the ratio of $Br_1$ to the residual flux density $Br_2$ determined in a direction parallel to the substrate plane and perpendicular to the recording direction, $Br_1/Br_2$, is not less than 1.3 and not more than 3; a process for producing said magnetic recording medium; and a magnetic recording system which uses said magnetic recording medium.

According to the second aspect of the present invention, there are provided a magnetic recording medium comprising a non-magnetic disk substrate and at least one layer of magnetic film formed directly or via at least one underlayer on the non-magnetic disk substrate, wherein the value of the product $Br\delta$ of the residual flux density $Br$ of the magnetic layer determined in the recording direction and the total layer thickness $\delta$ of the magnetic layer is not less than 5 G$\mu$m and less than 80 G$\mu$m and the value of the anisotropic magnetic field $H_k$ of the medium is not less than 7 kOe and not more than 20 kOe; a process for producing said magnetic recording medium; and a magnetic recording system which uses magnetic recording medium.

DETAILED DESCRIPTION OF THE INVENTION

Figure 1:
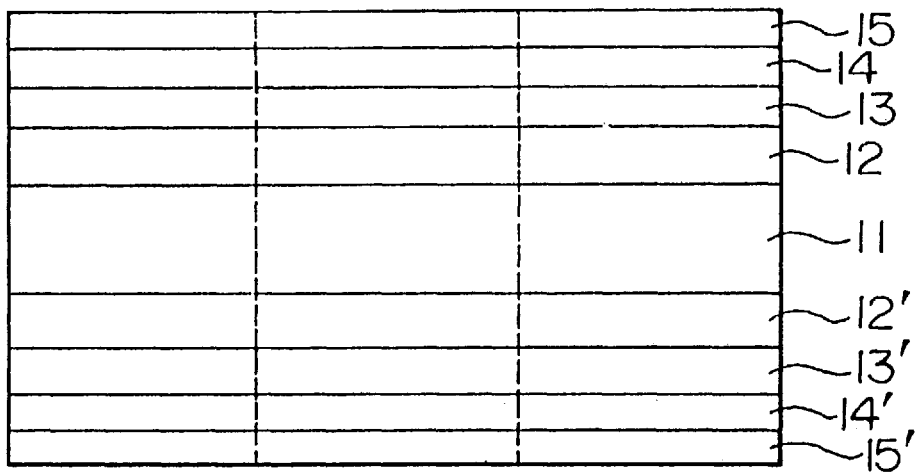
FIG. 1 is a sectional view showing the structure of a thin film magnetic recording medium according to one embodiment of the present invention.

The first aspect of the present invention is described below.

To achieve the first object described above, the magnetic recording medium of the present invention is provided with a magnetic layer on a non-magnetic substrate directly or via a metallic underlayer, said magnetic layer being formed in such a way that the value of the product $Br_1\delta$ of the residual flux density $Br_1$ determined in the recording direction and the total layer thickness $\delta$ is not less than 5 G$\mu$m and not more than 180 G$\mu$m, and the value of the ratio of $Br_1$ to the residual flux density $Br_2$ determined in a direction parallel to the substrate plane and perpendicular to the recording direction, $Br_1/Br_2$, is not less than 1.3 and not more than 3.

The magnetic recording medium preferably has a total magnetic layer thickness $\delta$ not less than 5 nm and not more than 60 nm and a coercivity not less than 1800 Oe. This is because turbulence of the magnetization transition region is decreased thereby, to reduce the width of the magnetization transition region, and resultantly a high output can be obtained even in a high recording density region. Further, a value of $Br_1\delta$ of not less than 5 G$\mu$m and not more than 80 G$\mu$m is particularly preferable because the medium noise is decreased thereby and a high medium S/N can be obtained. To secure a good overwrite characteristic, the coercivity Hc is preferably not more than 500 Oe.

The magnetic recording medium is preferably provided with a protective layer on the magnetic layer. The protective layer surface preferably has an average roughness factor Ra not less than 0.3 nm and not more than 3 nm as determined in a direction perpendicular to the recording direction, because then the head may fly stably even when the flying height is not less than 0.02 $\mu$m and not more than 0.1 $\mu$m.

The magnetic layer surface preferably has an average roughness factor Ra not less than 0.3 nm and not more than 1.9 nm as determined in a direction perpendicular to the recording direction, because then the head can stably maintain a low flying height. An average roughness factor Ra of the magnetic layer surface not less than 0.3 nm and not more than 1 nm is particularly preferable because then the head can fly stably even when the flying height is not less than 0.02 μm and not more than 0.05 μm. The average roughness factor Ra is determined by using a needle touch-type surface profiler of a needle point diameter of 0.2 μm or less, a scanning tunnel microscope, an electron beam three-dimensional roughness measuring apparatus, and the like. A measuring distance not less than 10 μm and not more than 100 μm is preferable for obtaining an accurate result.

When the average roughness factor Ra of the magnetic layer surface of the magnetic recording medium is not less than 0.3 nm and not more than 1.9 nm, it is effective, for providing to the magnetic layer a magnetic anisotropy in the recording direction and attaining an orientation ratio of Br (i.e., $Br_1/Br_2$) not less than 1.3 and not more than 3, to increase the average density of grooves on the substrate surface measured in a direction perpendicular to the recording direction. That is, an average density N, in a distance of 1 μm in a direction perpendicular to the recording direction, of texture grooves having a depth not less than 1 nm and not more than 50 nm, which is effective for imparting magnetic anisotropy, of not less than 0.3 and not more than 100 is preferred. Further, it is effective to make the depth and spacing of the grooves irregular because the orientation ratio of Br is improved and stickiness of the head at the time of contact start/stop (hereinafter abbreviated as CSS) operation is suppressed thereby as compared with a magnetic recording medium having a uniform texture formed thereon.

It is effective to make the crystals in the magnetic layer grow in an orientation such that the axis of easy magnetization of the layer becomes approximately parallel to the substrate plane, because the magnetic anisotropy in the recording direction is improved and the orientation ratio of Br is improved. For making the magnetic layer crystals grow such that the axis of easy magnetization becomes approximately parallel to the substrate plane, it is effective to form the medium on a substrate having a small surface roughness. For example, when the substrate surface is textured so as to have a surface average roughness factor Ra not more than 1.9 nm, and then a magnetic layer and a protective layer are formed thereon directly or via a metallic underlayer, the axis of easy magnetization of the magnetic layer crystal becomes approximately parallel to the substrate plane.

When the magnetic recording medium surface is made to have a smaller value of surface average roughness factor Ra than previous ones, it is preferable, after forming a protective layer on the magnetic layer, to form minute unevenness not more than 20 nm in height on the surface by plasma etching using a fine mask, or to form minute protrusions on the protective layer surface by using a target of a compound or a mixture, or to form a minute unevenness on the surface by heat treatment, because the frictional force between the head and the magnetic recording medium at the time of CSS operation can be decreased and sticking of the head to the magnetic recording medium can be prevented.

Co alloys are preferably used as the magnetic layer. For example, alloys of Co—Ni, Co—Cr, Co—Fe, Co—Mo, Co—W, Co—Re, etc. or alloys comprising these as the main component are preferably used. For example, magnetic layers of alloys obtained by adding to a Co-based alloy at least one element selected from Ni, Cr, Mo, W, Zr, Ta, Nb, Al, Si, Pt, B and P have a high Hc. Magnetic layers of Co—Ni—Zr, Co—Cr—Ta, Co—Ni—Cr, Co—Cr—Pt or alloys comprising these as the main component have an excellent corrosion resistance.

It is preferable to make the crystals of the magnetic layer grow in an orientation such that the (110) crystal lattice plane of a hexagonal crystal structure of the magnetic layer becomes approximately parallel to the substrate, because Hc is improved thereby. The substrate temperature in forming the magnetic layer is preferably not less than 200° C. and not more than 500° C., because the segregation structure in the magnetic layer is promoted to improve Hc.

Further, the magnetic layer is preferably formed of plural (at least two) layers, because the medium noise Nd becomes lower than in single-layer magnetic layers. The number of layers of the plural layers is preferably about 5 or less from the viewpoint of the ease of the production step. When the magnetic layer is formed of plural layers it is preferable to provide between respective two of these layers a non-magnetic intermediate layer of a thickness not less than 0.5 nm and not more than 5 nm which comprises at least one member selected from the group consisting of Cr, Mo, W, V, Ta, Nb, Zr, Ti, B, Be, C, Ni—P, and Ni—B as the main component.

It is preferable to form as a metallic underlayer at least one metal selected from Cr, Mo, W, Nb and Ta or an alloy comprising at least one of these metals as the main component, particularly said alloys additionally containing at least one element selected from Ti, Pt, Pd, Si, Fe, V, P and B, with a film thickness of 5–500 nm, because the medium noise is lowered. When an alloy is used, it preferably contains at least 80% of the aforesaid metal(s).

The metallic underlayer may be composed of at least two non-magnetic layers. In this case, the non-magnetic layer of the substrate side is preferably a film, formed with a thickness of 5–500 nm, of Zr, Si, Ti, Sc, Al, Ge, Sb, Ga, Ru, Pd, V, Nb, Hf, Rh, Ni—P, Ni—B or an alloy comprising at least one of these as the main component, because high $Br_1$ and high coercivity can be obtained even when a substrate formed of ceramic materials, such as glass, $TiO_2$, carbon, etc. is used. The non-magnetic layer of the magnetic layer side may be formed of the aforesaid metals or alloys.

It is preferable to form, as a protective layer for the magnetic layer, a film of carbon, hydrogenated carbon or a non-magnetic material comprising carbon as the main component with a film thickness of 10–50 nm and further to provide a lubricant layer of adsorptive perfluoroalkyl polyether, etc. with a film thickness of 3–20 nm, because a magnetic recording medium having a high reliability and capable of high density recording can thereby be obtained.

The protective layer may also use carbides such as WC and (W—Mo)—C, nitrides such as (Zr—Nb)—N and $Si_3N_4$, oxides such as $SiO_2$ and $ZrO_2$, B, $B_4C$, $MoS_2$ or Rh, for the purpose of improving the sliding resistance and corrosion resistance of the magnetic recording medium. These protective layers are preferably made to have a larger surface roughness than the magnetic layer surface by etching the surface using a mask to provide protrusions with an area ratio of 1–20%, or by controlling the layer-forming condition, layer composition, etc. to precipitate different phase protrusions on the surface.

To achieve the second object described above, the process for producing the magnetic recording medium of the present invention comprises plasma-etching a non-magnetic substrate by using argon gas and then forming a magnetic layer thereon directly or via a non-magnetic underlayer, to prepare any of the aforesaid magnetic recording media. Such a method makes it possible to obtain a structure wherein the axis of easy magnetization is nearly completely parallel to the substrate plane.

The plasma etching treatment is preferably conducted by using a high frequency plasma at a plasma output density not less than 30 mW/cm² and not more than 1000 mW/cm², to enable the improvement of the crystallinity of the magnetic layer. Further, in forming the magnetic layer and the underlayer, it is preferable to increase the evacuation speed of the film-forming vacuum chamber and the speed of growth of the layer or to apply a negative bias voltage not less than 10 V and not more than 500 V to the substrate, because it decreases the concentration of impurities, such as water, oxygen, etc. which may contaminate the magnetic layer and the underlayer and thereby improves the crystallinity of the magnetic layer.

To achieve the third object described above, the magnetic recording system according to the present invention comprises any one of the aforesaid magnetic recording media, a magnetic recording medium driving part for driving the magnetic recording medium in a recording direction (i.e. a track direction), a magnetic head for recording and reading signals on and from the magnetic recording medium in the recording direction, a magnetic head driving part for driving the magnetic head in a track seeking direction substantially perpendicular to the recording direction (i.e. the track direction), and a recording-reading signal processing system, said magnetic head having a magnetoresistive effect type reading part and said magnetic recording medium driving part being capable of controlling the flying height of the magnetic head to a range not less than 0.02 µm and not more than 0.1 µm depending on the properties of the head.

To detect the magnetic flux from the magnetic recording medium effectively with an MR head, the flying height of the head is preferably controlled to a range not less than 0.02 µm and not more than 0.1 µm. In the prior magnetic recording media, textures of Ra of 2 nm or more are formed on the substrate surface for the purpose of preventing head sticking or improving the magnetic properties, and the protruded parts of the texture tend to contact with the head when the flying height is lowered, so that the flying height cannot be decreased to 0.1 µm or less. When the aforesaid magnetic recording medium is used, such a flying height can be easily attained.

When the present magnetic recording medium is combined with an MR head having a track width of 5 µm or less, a highly reliable magnetic recording system having a large capacity can be obtained. When a signal processing circuit based on a maximum likelihood composite algorithm is included in the system, the recording density can be further improved.

When the product $Br_1\delta$ of the residual flux density $Br_1$ and the layer thickness $\delta$ of a magnetic recording medium is excessively large, the magnetization rotation of an MR film becomes unstable and Barkhausen noise is generated from the head. Further, when $Br_1\delta$ increases, the demagnetizing field Hd increases in the transition region of recorded bits to increase the fluctuation of magnetization, so that the medium noise Nd becomes very large when an MR head having a high read back efficiency is used. Since an MR head has a high read back efficiency, if $Br_1\delta$ exceeds 180 Gµm the read output reaches saturation and the waveform of the output signal becomes asymmetric. On the other hand, if $Br_1\delta$ is less than 5 Gµm the output power is small and is on about the same level as the medium noise, so that a high S/N ratio cannot be obtained. Therefore, the value of $Br_1\delta$ is controlled to a range not less than 50 Gµm and not more than 180 Gµm to obtain a high S/N ratio in conformity with the read back efficiency of the MR head used.

In a prior magnetic recording medium having nearly isotropic magnetic properties wherein $Br_1/Br_2$ is not less than 1 and not more than 1.2, when the linear recording density becomes 100 kBPI or more the leakage flux which flows from the magnetic recording medium to the head decreases, so that a high S/N ratio cannot be obtained even when the efficiency of the MR head is increased. However, when the value of $Br_1/Br_2$ is not less than 1.3 and not more than 3, the change of magnetization in the magnetization transition region becomes steep, so that the output from the magnetic recording medium does not decrease even when the linear recording density is increased, and a high S/N ratio can be obtained. When $Br_1/Br_2$ is larger than 3.1, on the other hand, magnetic interaction between magnetization transition regions increases steeply to increase the medium noise, so that a high S/N ratio cannot be obtained.

When the recording track density of a magnetic recording medium is not less than 3.5 kTPI, prior art magnetic recording media having isotropic magnetic properties cannot give a sufficient width of side-writing band in the track width direction, so that a sufficient recording track width cannot be secured when the track width of the MR head is small. When $Br_1/Br_2$ is not less than 1.3 and not more than 3, however, the width of side-writing band in the track width direction becomes larger than in prior magnetic recording media, so that a sufficient recording track width can be secured even when the track width of the MR head is small.

For effectively detecting the magnetic flux from a magnetic recording medium with an MR head, it is effective to reduce the flying height of the head. Herein, when the protective layer has an average roughness factor Ra not less than 0.3 nm and not more than 3 nm as measured in a direction perpendicular to the recording direction, the head flies stably even when the flying height is not less than 0.02 µm and not more than 0.1 µm. When the magnetic layer has an average roughness factor Ra not less than 0.3 nm and not more than 1.9 nm as determined in a direction perpendicular to the recording direction, the head flies stably even when the flying height is not less than 0.02 µm and not more than 0.1 µm.

When a magnetic recording medium has a total magnetic layer thickness less than 5 nm, the crystal grain size of the magnetic layer decreases with the decrease of $\delta$ and the coercivity Hc decreases owing to the effect of temperature fluctuation of magnetization. When the thickness $\delta$ of the magnetic layer is larger than 60 nm, the magnetic layer tends to be magnetized in the vertical direction and hence Hc decreases. Therefore, to attain a value of Hc of 1800 Oe or more, $\delta$ must have a value not less than 5 nm and not more than 60 nm. When Hc is 1800 Oe or more, the width of the magnetization transition region decreases and the half-output recording density $D_{50}$ improves, so that a high output can be obtained even at a high linear recording density; simultaneously, the medium noise decreases, so that the S/N ratio of read back signals improves. When Hc exceeds 3500 Oe, the overwrite characteristic becomes 20 dB or less, so that Hc is preferably 3500 Oe or less.

When the average density of grooves on the substrate surface determined in a direction perpendicular to the recording direction is increased, magnetic anisotropy in the recording direction is improved and resultantly the orientation ratio $Br_1/Br_2$ can be made to have a value not less than 1.3 and not more than 3 even at an Ra of 1.9 nm or less. When the depth and the spacing of the grooves are made irregular, magnetic anisotropy in the recording direction is improved to improve the orientation ratio of Br, as compared with a magnetic recording medium having a uniform texture formed thereon; simultaneously, the contact area of the head with the magnetic recording medium decreases to suppress the sticking of the head. When the substrate surface is textured so as to have a surface roughness Ra of 1.9 nm or less and then a magnetic layer and a protective layer are formed thereon directly or via a metallic underlayer, the waviness of the crystal plane containing the axis of easy magnetization of the magnetic layer decreases, so that magnetic anisotropy in the recording direction improves to improve the orientation ratio of Br.

When the substrate is subjected to plasma etching using an argon gas at a plasma output density not less than 30 mW/cm$^2$ and not more than 1000 mW/cm$^2$, the crystallinity of the metallic underlayer or the magnetic layer is improved and magnetic anisotropy in the recording direction is improved, so that the orientation ratio of Br is increased. Further, when the evacuation speed of the film-forming vacuum chamber and/or the growth speed of the layer are increased and/or a negative bias voltage not less than 10 V and not more than 500 V is applied to the substrate at the time of film formation, the concentration of impurities, such as water and oxygen, which contaminate the magnetic layer and the metallic underlayer is decreased to improve the crystallinity of the magnetic layer or metallic underlayer and magnetic anisotropy in the recording direction is improved further, so that the orientation ratio of Br is markedly improved.

When, after a protective layer has been formed on the magnetic layer, the protective layer is subjected to plasma etching using a fine mask to form minute unevenness 20 nm or less in height on the surface, or minute protrusions are formed on the protective layer surface by using a target of a compound or a mixture, or minute unevenness is formed on the surface by heat treatment, the contact area and frictional force between the head and the magnetic recording medium are decreased and hence sticking of the head to the magnetic recording medium can be avoided. Therefore, it is particularly preferable to provide the protective layer with a surface roughness different from that of the magnetic film surface.

Since the magnetic recording medium according to the present invention gives a very high S/N ratio, a high capacity magnetic recording system can be obtained which gives an S/N ratio of 4 or more at a high recording density of not less than 100 kBPI and a track density of not less than 3.5 kTPI when read back is conducted with an MR head of a track width not more than 5 $\mu$m. A more preferred method is to combine therewith a signal processing circuit based on a maximum likelihood composite algorithm, because recording density is further enhanced thereby.

Nextly, the second aspect of the present invention is described below.

When a GMR head is used, it is important for the medium to reduce the effect of the demagnetizing field of the magnetization transition region by decreasing the product (Br$\delta$) of the residual flux density of the magnetic film determined in the recording direction and the total magnetic layer thickness and by simultaneously increasing the anisotropic magnetic field (H$_k$) of the magnetic layer.

The present inventors have made extensive study on the magnetic properties of a medium and its read/write characteristics with a GMR head. As the result, the inventors have found that it is effective for achieving the aforesaid objects that the product Br$\delta$ of the residual flux density Br of the magnetic layer of the medium and the magnetic layer total thickness $\delta$ is not less than 5 G$\mu$m and not more than 80 G$\mu$m, and the anisotropic magnetic field H$_k$ of the medium is not less than 7 kOe and not more than 20 kOe. In particular, to decrease the medium noise further at a linear recording density of 150 kBPI thereby to improve the S/N ratio, the value of Br$\delta$ is preferably not less than 5 G$\mu$m and not more than 30 G$\mu$m.

The aforesaid value of H$_k$ may be determined by the following method using a torque magnetometer. A magnetic layer sample is reciprocally rotated 360 degrees in the substrate plane while applying a magnetic field in the substrate surface of the sample, and the area within the torque curve thus obtained is determined. This area is called the rotation hysteresis loss Wr. When Wr is plotted against the reciprocal number of the applied magnetic field, the magnetic field at which Wr becomes zero at the high magnetic field side in the plot is H$_k$.

In the aforesaid magnetic recording medium, when the total magnetic layer thickness $\delta$ is not less than 5 nm and not more than 30 nm and the coercivity is not less than 1000 Oe and not more than 3500 Oe, the turbulence of the magnetization in the magnetization transition region decreases to decrease the width of the magnetization transition region, and a high output can be obtained even in a high recording density region.

When the width of the magnetic layer crystal grain boundary is not less than 0.5 nm and not more than 5 nm, Hc improves and noise decreases.

In the aforesaid magnetic recording medium, when the magnetic layer has a hexagonal crystal structure, its c-axis is substantially oriented in the direction of the substrate plane and further the value of the ratio of the length c to the length a of the lattice constant of hexagonal system, namely c/a, is not less than 1.3 and not more than 1.6, the anisotropic magnetic field is enhanced. Herein, the values of c and a may be determined by X-ray diffraction analysis, electron beam diffraction analysis or transmission electron microscopic observation of the magnetic layer. In X-ray diffraction analysis, it is necessary to make the sample plane inclined relative to the incident X-ray according to necessity.

In the aforesaid magnetic recording medium, when the density of stacking faults constituted by a face centered cubic (fcc) lattice in the magnetic layer crystal having a hexagonal structure is 5% or less, the anisotropic magnetic field is enhanced. The width of the crystal grain boundary or the density of stacking faults of the magnetic layer may be determined by directly observing the lattice image of about 100 crystal grains of the magnetic layer with a transmission electron microscope of high resolution and averaging the observed values.

In the aforesaid magnetic recording medium, when the total concentration of oxygen, carbon and nitrogen is 1% by atoms or less, a still more improved anisotropic magnetic field is obtained. The total concentration of oxygen, carbon and nitrogen in the magnetic layer may be determined by fluorescent X-ray spectroscopy, or secondary ion mass spectrometry using cluster ions of a Cs ion with the elements to be analyzed.

In producing the magnetic recording medium described in the present specification, when the evacuation speed of the film-forming vacuum chamber or the speed of growth of the film is increased, or when a negative bias voltage not less than 10 V and not more than 500 V is applied to the substrate in forming the non-magnetic underlayer and magnetic layer the crystallinity of the layer is improved to enhance the anisotropic magnetic field. An alternating current bias voltage may be used with similar effect so long as it contains a direct current component.

When the magnetic layer and the underlayer are made to contain at least one element selected from Ar, Xe and Kr at an atomic concentration not less than 0.1% and not more than 5% by the above-mentioned application of bias voltage, ion implantation, etc., a compressive stress is increased in the layer plane to enhance the anisotropic magnetic field and the coercivity. Particularly when Xe or Kr, which have a large atomic radius, is incorporated, the compressive stress in the film can be greatly increased to enhance the anisotropic magnetic field and the coercivity.

In the above-mentioned magnetic recording medium, when the magnetic layer comprises Co as the main component and at least one element selected from Ni, Cr, Mo, W, Zr, Ta, Nb, Al, Si, Pt, B and P added thereto, a high Ha is obtained. Particularly when the magnetic layer comprises Co as the main component and Cr added thereto in a concentration not less than 15% and not more than 22% by atoms, the noise of the medium is greatly decreased.

When the substrate temperature in depositing the medium layer is not less than 200° C. and not more than 500° C., the segregation structure formation in the magnetic layer is promoted to improve Hc. When the medium is heat treated at a temperature not lower than 200° C. after layer formation, segregation is promoted to increase the coercivity further and to decrease the noise. However, when the heat treatment temperature is higher than 600° C., the grain diameter increases excessively and the noise increases, so that the heat treatment is preferably conducted at a temperature not higher than 600° C.

When the magnetic layer is made to have a multi-layer structure of two or more layers by providing therebetween a non-magnetic intermediate layer having a layer thickness not less than 0.5 nm and not more than 5 nm and comprising at least one member selected from the group consisting of Cr, Mo, W, V, Ta, Nb, Zr, Ti, B, Be, C, Ni—P and Ni—B, the noise of the medium is markedly decreased.

When the magnetic layer surface has an average roughness factor Ra not less than 0.3 nm and not more than 1.9 nm as determined in a direction perpendicular to the recording direction, the head can fly stably even at a flying height of 0.1 $\mu$m or less. Further, when the magnetic recording medium has a protective layer provided on the magnetic layer and the protective layer surface has an average roughness factor Ra not less than 0.3 nm and not more than 3 nm as determined in a direction perpendicular to the recording direction, the head can fly stably even at a flying height of 0.1 $\mu$m or less.

When an alloy underlayer comprising Cr, Mo, W, Nb or Ta as the main component and at least one element selected from Ti, Pt, Pd, Si, Fe, V, Ru, P and B added thereto is formed between the non-magnetic disk substrate and the magnetic layer to adjoin the magnetic layer with a layer thickness not less than 5 nm and not more than 500 nm, the orientation of the magnetic layer is improved, the anisotropic magnetic field is enhanced, and the medium noise is decreased. Further, when the aforesaid underlayer is constructed of at least two non-magnetic layers, and the substrate-side underlayer is formed of Zr, Si, Ti, Sc, Al, C, Ge, Sb, Ga, Ru, Pd, V, Nb, Ta, Hf, Rh, Ni—P or Ni—B or an alloy comprising at least one of these as the main component, the anisotropic magnetic field is improved and a high Br and high coercivity can be obtained even when a substrate comprising chemically strengthened glass, organic resin, Ti, Si, carbon or ceramic materials such as $TiO_2$ and SiC is used.

The magnetic layer is preferably formed of Co, Fe, Ni or an alloy comprising at least one of these as the main component. Particularly preferably, the layer comprises, as the main component, such an alloy as Co—Ni, Co—Cr, Co—Fe, Co—Mo, Co—W or Co—Re and the crystals are grown in an orientation such that the (110) crystal lattice plane of the hexagonal crystal structure becomes approximately parallel to the substrate, because Hc is enhanced thereby. When an excellent corrosion resistance is desired, the magnetic substance used for constituting the magnetic layer is preferably an alloy comprising Co—Ni—Zr, Co—Cr—Ta, Co—Ni—Cr or Co—Cr—Pt as the main component.

By forming a film of carbon, hydrogenated carbon or a non-magnetic material comprising carbon as the main component with a film thickness of 10–50 nm as the protective layer of the magnetic layer and by further providing a lubricant layer of adsorptive perfluoroalkyl polyether or the like with a layer thickness of 3–20 nm, a highly reliable magnetic recording medium capable of high density recording can be obtained. The use of carbides, such as WC, (W—Mo)—C, etc., nitrides, such as (Zr—Nb)—N, $Si_3N_4$, etc., oxides, such as $SiO_2$, $ZrO_2$, etc., or B, $B_4C$, $MoS_2$, Rh or the like for the protective layer is preferable because it improves sliding resistance and corrosion resistance. The protective layer is preferably made to have a larger surface roughness than the magnetic layer surface by providing thereto protrusions with an area ratio of 1–20% by etching the surface using a mask or by precipitating different phase protrusions on the surface by controlling film forming condition, composition, etc.

For suppressing the sticking of the head to the medium surface at the time of CSS operation when the surface has a smaller value of Ra than previous ones, minute unevenness 20 nm or less in height is formed on the protective layer surface by plasma etching using a fine mask after forming the protective layer on the magnetic layer, or minute protrusions are formed on the protective layer surface by using a target of a compound or a mixture, or minute unevenness is formed on the surface by heat treatment, whereby the frictional force between the head and the medium can be decreased at the time of CSS operation and the problem of sticking of the head to the medium can he avoided.

By combining the present magnetic recording medium with a GMR head having a track width of 2 $\mu$m or less, a magnetic recording system of large capacity and high reliability can be provided. By additionally combining a signal processing circuit based on a maximum likelihood composite algorithm, the recording density can be further increased.

When the product Br$\delta$ of the residual flux density Br and the layer thickness $\delta$ of the medium is excessively large, the magnetization rotation of the GMR film becomes unstable and Barkhausen noise is generated from the head. When Br$\delta$ increases, the demagnetizing field Hd increases in the transition region of the recorded bits to increase fluctuation of the magnetization and resultantly, when a GMR head having a high read back efficiency is used, the medium noise Nd increases markedly. Further, since a GMR head has a high read back efficiency, when Br$\delta$ is 80 G$\mu$m or more, the read output reaches saturation and the waveform of the read back signal becomes asymmetric. When Br$\delta$ is less than 5 G$\mu$m, the read output is small and is about the same magnitude as the noise, so that a high S/N ratio cannot be obtained. Accordingly, by controlling the Br$\delta$ of the medium to a range not less than 5 G$\mu$m and less than 80 G$\mu$m in conformity with the read back efficiency of the GMR head used, a high S/N ratio can be obtained.

By controlling Br$\delta$ to a range not less than 5 G$\mu$m and not more than 30 G$\mu$m, fluctuation of the magnetization in the recorded bit can be decreased, and the medium noise can be greatly decreased at a high linear recording density of 150 kBPI or more.

At a high linear recording density of 150 kBPI or more, the length of the recorded bit becomes small, and the dimension of the zigzag form in the magnetization transition part becomes about the same as the bit length. Further, an interaction between the magnetization transition parts also emerges, and the recorded bit tends to assume an irregular form, instead of an ideal rectangle as in the prior low recording density. To obtain a high output also in such cases, it is effective to increase the anisotropic magnetic field $H_k$ of the magnetic film of the medium to a higher value than before of not less than 7 kOe and not more than 20 kOe and decrease the effect of the demagnetizing field in the magnetization transition part.

For increasing Hc to 1000 Oe or more, it is necessary that 6 has a value not less than 5 nm and not more than 30 nm. When Hc is 1000 Oe or more, the width of the magnetization transition region decreases and the half-output recording density $D_{50}$ improves; resultantly a high output can be obtained even at the time of a high linear recording density and, since the medium noise Nd decreases simultaneously, the S/N ratio of read back signals improves. The value of Hc is preferably 3500 Oe or less, because when Hc is higher than 3500 Oe, the overwrite characteristic becomes 20 dB or less. When the total magnetic layer thickness δ of the medium is 5 nm or less, the crystal grain diameter of the magnetic layer decreases with the decrease of δ, and the coercivity Hc decreases owing to the effect of temperature fluctuation of the magnetization. A magnetic layer thickness δ of 30 nm or more is also unpreferable because then the magnetic layer tends to be magnetized in the vertical direction, leading to a lowered Hc.

When the grain boundary width of the magnetic layer crystals is not less than 0.5 nm and not more than 5 nm, magnetic interaction among the magnetic clusters decreases, to improve Hc and decrease the medium noise.

When the c-axes of the magnetic layer having a hexagonal crystal structure are oriented substantially in the substrate plane direction and further a compressive strain is applied to the magnetic layer crystal in the substrate plane direction so that the ratio of the length c to the length a of the lattice constant of the hexagonal system (namely, c/a) may be not less than 1.3 and not more than 1.6, $H_k$ and Hc are improved, as compared with those of the prior art owing to the reverse magnetostrictive effect.

When the density of stacking faults constituted by a face centered lattice in the magnetic layer crystal is reduced to 5% or less, hexagonal system crystals having a large magnetic anisotropy constant can be regulated to a uniform size of about 20–30 nm, which is about the same as the width of magnetic domain walls, so that $H_k$ and Hc can be improved.

When the total concentration of oxygen, carbon and nitrogen in the magnetic layer is reduced to 1% by atoms or less, the misorientation and defects of the hexagonal system crystal lattice in the magnetic layer are decreased, to increase the magnetic anisotropy constant and improve $H_k$ and Hc.

For forming such a high $H_k$ and high Hc magnetic layer, it is effective in forming the non-magnetic underlayer and the magnetic layer to increase the evacuation speed of the film-forming chamber to reduce the concentration of impurity gases such as water vapor, to increase the film-forming velocity, and to apply a substantially negative bias voltage not less than 10 V and not more than 500 V to the substrate.

In particular, by applying a bias voltage of –200 V or more, a magnetic layer having the desired magnetic properties can be obtained. This is because the reduction of impurity gas concentration in the film-forming chamber, the increase of film-forming velocity and the application of bias voltage help the removal of the contaminated layer on the surface of the substrate and the underlayer, the removal of impurities such as oxygen and nitrogen and the promotion of the substrate surface diffusion of vapor-deposited particles, whereby the defects and misorientation of the crystal lattice are reduced and non-magnetic elements are segregated to the crystal grain boundary to develop the crystal grain boundary.

For forming a high $H_k$ and high Hc magnetic layer, further, it is important to match the size of the crystal lattice of the underlayer with the size of the crystal lattice of the magnetic layer and decrease the defects and misorientation of the crystal lattice. It is effective for this purpose to add at least one element selected from Ti, Pt, Pd, Si, Fe, V, Ru, P and B to the underlayer comprising Cr, Mo, W, Nb or Ta as the main component. It is also important to reduce the defects and misorientation of the crystal lattice of the underlayer as in the magnetic layer. For this purpose, the underlayer is made to be composed of at least two non-magnetic layers and the substrate side underlayer is formed with Zr, Si, Ti, Sc, Al, C, Ge, Sb, Ga, Ru, Pd, V, Nb, Ta, Hf, Rh, Ni—P, Ni—B or an alloy comprising at least one of these as the main component, whereby the crystalline misorientation caused by the substrate material and the diffusion of impurities can be suppressed.

To detect the magnetic flux from the medium effectively with a GMR head, the decrease of the flying height of the head is effective. When the protective layer surface of the medium has an average roughness factor Ra not less than 0.3 nm and not more than 3 nm as determined in a direction perpendicular to the recording direction, the head flies stably even at a flying height of 0.1 μm or less. Further, when the magnetic layer surface has an average roughness factor Ra not less than 0.3 nm and not more than 1.9 nm as determined in a direction perpendicular to the recording direction, the head flies stably even at a flying height of 0.1 μm or less.

When, after forming a protective layer on the magnetic layer, a minute unevenness 20 nm or less in height is formed on the surface by plasma etching using a fine mask, or minute protrusions are formed on the protective layer surface by using a target of a compound or a mixture, or a minute unevenness is formed on the surface by heat treatment, the contact area and the frictional force between the head and the medium are decreased and hence the problem of sticking of the head to the medium can be avoided. Therefore, it is particularly preferable to give to the protective layer a surface roughness different from that of the magnetic layer surface by the above-mentioned treatments.

Since the medium according to the present invention gives a very high S/N ratio, a large capacity magnetic recording system can be provided which gives an S/N ratio of 1 or more at a track density of 10 kTPI or more and a high recording density of 150 kBPI or more when read back is conducted with a GMR head having a track width of 2 μm or less.

EXAMPLE 1

The first aspect of the present invention is described below with reference to an example.

FIG. 1 is a sectional view schematically showing the structure of the thin film magnetic recording medium of the present invention. In FIG. 1, 11 is a substrate comprising a ceramic such as $TiO_2$ and SiC, Al—Mg alloy, chemically strengthened glass, organic resin, Ti, Si, carbon, etc.; and 12 and 12' are non-magnetic plated layers comprising Ni—P, Ni—W—P, etc. formed on both sides of the substrate 11. When an Al—Mg alloy is used for a substrate, it is preferable to provide such a non-magnetic plated layer.

Further, 13 and 13' are non-magnetic metallic underlayers formed of Cr, Mo or W or an alloy comprising any of these as the main component; 14 and 14' are magnetic layers comprising Co—Ni, Co—Cr, Co—Fe, Co—Mo, Co—W, Co—Pt, Co—Re, Co—P, Co—Ni—Zr, Co—Cr—Ta, Co—Cr—Pt, Co—Ni—Cr, Co—Cr—Al, Co—Cr—Nb, Co—Ni—P or Co—Cr—Si, etc. formed on the metallic underlayers; 15 and 15' are non-magnetic protective layers comprising C, WC, (W—Mo)—C, (W—Zr)—C, SiC, (Zr—Nb)—N, SiC, (Zr—Nb)—N, $Si_3N_4$, $SiO_2$, $ZrO_2$, B, $B_4C$, $MoS_2$ or Rh, etc. formed on the magnetic layers.

The process for producing the magnetic recording medium of the present example is described below in detail. A plurality of substrates 11 formed of Al-4Mg (the numeral before an element symbol indicates the content of the relevant material (i.e., the atom) expressed in terms of % by weight unless stated otherwise) having an outside diameter of 95 mm, inside diameter of 25 mm and thickness of 0.8 mm were prepared and then non-magnetic plated layers 12 and 12' having a layer thickness of 13 $\mu$m and comprising Ni-12P were respectively formed on both sides of each substrate. The surface of the substrate was smoothly polished by using a lapping machine until an average roughness factor Ra of 1.5 nm was reached, then washed and dried. Thereafter, polishing tapes were pressed against both sides of the substrate through contact rolls by using a tape polishing machine in the presence of an abrasive material having an average grain diameter of 1 $\mu$m or less while rotating the substrate, to form texture grooves having irregular depth and density in the recording direction on the substrate surface. Then the substrate was cleaned of the abrasive material and other dirt adhered thereto by washing, and dried.

In the above step, the average grain diameter of the abrasive material used was changed according to the respective substrates to vary the average roughness factor Ra determined in a direction parallel to the substrate plane and approximately perpendicular to the recording direction (that is, in the radial direction) in a range not less than 0.3 nm and not more than 1.9 nm. Further, the rotation speed of the substrate and the treating time were changed to vary the average density N of grooves having a depth not less than 1 nm and not more than 50 nm, in a distance in the substrate radial direction of 1 $\mu$m in the range of 0.015 to 200.

The substrate was maintained under vacuum in a sputtering apparatus by using a vacuum pump having a pumping speed of water vapor per vacuum chamber volume of 200 l/sec or more, heated up to 300° C., and metallic underlayers 13 and 13', comprising Cr and having a thickness of 50 nm were formed thereon under an argon pressure of 2 mTorr. Then, Co-17Cr-5Ta (% by atoms) alloy-based magnetic layers 14 and 14' were formed on the metallic underlayers with a thickness of 25 nm. Thereafter, protective layers 15 and 15' of carbon having a layer thickness of 20 nm were formed on the magnetic layers and finally lubricant layers of adsorptive perfluoroalkyl polyether, etc. were formed on the protective layers.

The magnetic recording medium produced by the above-mentioned method was subjected to X-ray diffraction analysis. Resultantly, it was confirmed that the crystals in the metallic underlayer had grown in an orientation such that the (200) crystal lattice plane of the body centered cubic structure became approximately parallel to the substrate plane. In the magnetic layer, the crystals had oriented themselves such that the (110) plane of the hexagonal structure became approximately parallel to the substrate plane. Since in the hexagonal structure the c-axis is the axis of easy magnetization, when the (110) plane or the (100) plane is approximately parallel to the substrate surface, the c-axis becomes approximately parallel to the substrate surface.

Further, the average roughness factor Ra of the protective layer surface determined in the radial direction was in a range not less than 0.3 nm and not more than 3 nm. After a part of the determinations described below had been conducted, the protective layer was removed by using oxygen plasma, and the average roughness factor Ra of the magnetic layer surface in the radial direction was determined. The values obtained were in a range not less than 0.3 nm and not more than 1.9 nm. Also when determined by such a method, the average roughness factor Ra was of the same value as the average roughness factor Ra of the magnetic layer surface determined when the magnetic layer was originally formed.

The magnetostatic properties (Hc, Br) of the magnetic recording medium obtained above were determined with a vibrating sample magnetometer (VSM) of a maximum applicable magnetic field of 14 kOe or a non-destructive magnetometer. With respect to read/write characteristics, the value of the S/N ratio of the read back signal was determined at a linear recording density of 100 kBPI by using a composite type thin film magnetic head having an MR sensor as the reading part, at a head flying height of 0.08 $\mu$m, effective gap length of 0.4 $\mu$m, and a track width of 3 $\mu$m.

Figure 2:
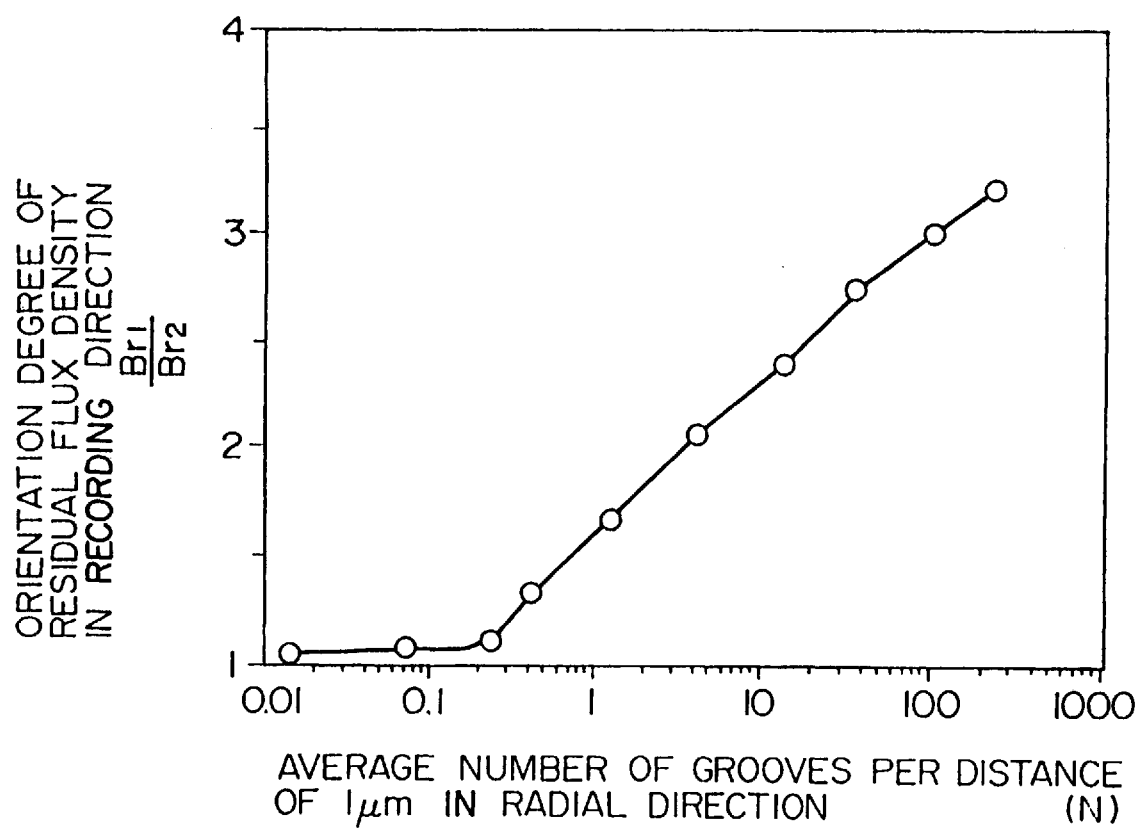
FIG. 2 is a graph showing the relationship between the average density N of grooves having a depth not less than 1 nm and not more than 50 nm on the substrate surface of a thin film magnetic recording medium in a distance of 1 $\mu$m in the direction perpendicular to the recording direction and the recording direction orientation ratio $Br_1/Br_2$ of the residual flux density.

FIG. 2 shows the relationship between the average density N of grooves of a depth not less than 1 nm and not more than 50 nm in a distance of 1 $\mu$m in the radial direction of the magnetic recording medium surface and the ratio ($Br_1/Br_2$) of the residual flux density $Br_1$ of the magnetic layer determined in the recording direction to the residual flux density $Br_2$ determined in the radial direction. When the average density N of grooves of a depth not less than 1 nm and not more than 50 nm in a radial direction distance of 1 $\mu$m is not less than 0.3 and not more than 100, the value of $Br_1/Br_2$ is shown to be not less than 1.3 and not more than 3. The value of the product $Br_1\delta$ of the residual flux density $Br_1$ of the magnetic layer of the magnetic recording medium falling in the aforesaid range determined in the recording direction and the layer thickness $\delta$ was not less than 80 G$\mu$m and not more than 180 G$\mu$m, and the coercivity Hc determined in the recording direction was not less than 1800 Oe and not more than 3500 Oe.

Using this magnetic recording medium, an MR head was seeked 100,000 times from the inner periphery to the outer periphery of the magnetic recording medium at a head flying height of 0.08 $\mu$m. Resultantly, it was confirmed that no contact of the head with the magnetic recording medium occurred.

Figure 3:
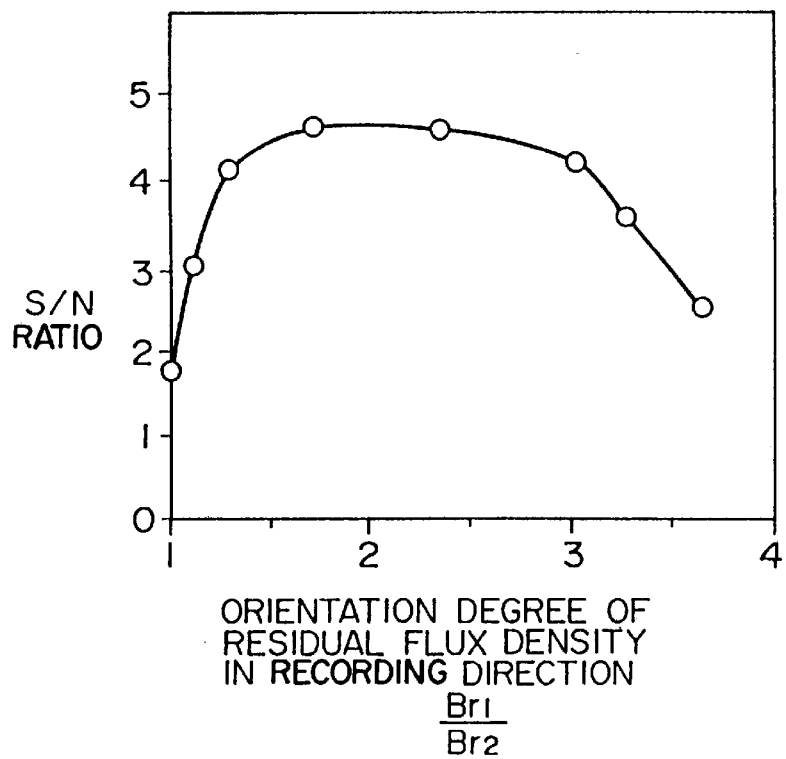
FIG. 3 is a graph showing the relationship between the recording direction orientation ratio $Br_1/Br_2$ of the residual flux density of a thin film magnetic recording medium and the S/N ratio of the medium determined by using an MR head.

FIG. 3 shows the relationship between the signal read back S/N ratio determined, by using an MR head with this magnetic recording medium, at a head flying height of 0.08 $\mu$m and a recording density of 100 kBPI and 3.5 kTPI and $Br_1/Br_2$. When the value of $Br_1/Br_2$ was not less than 1.3 and not more than 3, an improved S/N ratio of 4 or more was obtained. It was confirmed that the ratio of the track width of the recorded bit formed on the magnetic recording medium to the track width of the head showed a large value of not less than 80% and not more than 100% when the value of $Br_1/Br_2$ was not less than 1.3 and not more than 3, and a small value of 70% or less when the value was less than 1.3.

Similar effects were also observed when Co-10Ni-10Cr (% by atoms), Co-40Ni-5Zr (% by atoms) or Co-30Ni-10Pt (% by atoms) was used for the magnetic layer.

Approximately similar effects were also observed when at least one metal selected from Cr, Mo, W, Nb and Ta or an alloy comprising it as the main component (exclusive of Cr used alone) was used for the metallic underlayer in place of Cr.

When the magnetic layer was formed directly on the substrate without forming the metallic underlayer, the coercivity was lower by 100–200 Oe than when the metallic underlayer was formed, but when the value of $Br_1/Br_2$ was not less than 1.3 and not more than 3, an improved S/N ratio of 3.5 or more was obtained.

As a comparative example, using a magnetic recording medium having an average roughness factor Ra of the protective layer determined in the radial direction of more than 3 nm or a magnetic recording medium having an average roughness factor Ra of the magnetic layer surface from which the protective layer had been removed of more than 1.9 nm as determined in the radial direction, an MR head was seeked 100,000 times from the inner periphery to the outer periphery of the medium at a flying height of 0.1 μm. Resultantly, it was confirmed that contact of the head with the magnetic recording medium occurred, thereby destroying one or more recorded bits on the magnetic recording medium.

EXAMPLE 2

A plurality of substrates of Al-4 Mg having an outside diameter of 65 mm, inside diameter of 20 mm and thickness of 0.3 mm were prepared, and non-magnetic plated layers comprising Ni-12P and having a thickness of 10 μm were respectively formed on both sides of each substrate. The surface of the substrate was smoothly polished by using a lapping machine until an average roughness factor Ra determined in the radial direction reached 1.0 nm, then washed and dried. Thereafter, polishing tapes were pressed against both sides of the substrate through contact rolls by using a tape polishing machine in the presence of an abrasive material having an average grain diameter of 0.25 μm or less while rotating the substrate, to form texture grooves having irregular depth and density in the recording direction on the substrate surface. The average roughness factor Ra of grooves formed on the surface determined in the radial direction was 0.5 nm for respective surfaces, and the average density N of the grooves having a depth not less than 1 nm and not more than 50 nm in a distance in the radial direction of 1 μm was 1.2 for respective surfaces.

The substrate was maintained under vacuum in a sputtering apparatus by using a vacuum pump having a pumping speed of water vapor per vacuum chamber volume of 200 l/sec or more, heated up to 260° C. and then subjected to plasma etching at an argon pressure of 5 mTorr and a frequency of 13.56 MHz. The plasma output density was not less than 10 mW/cm² and not more than 2000 mW/cm² and the etching film thickness was 2 nm or less.

Thereafter, a metallic underlayer having a thickness of 150 nm and comprising Cr-20Ti (% by atoms) was formed under an argon pressure of 5 mTorr. Then a Co-18Cr-10Pt (% by atoms) alloy-based magnetic layer was formed with a thickness of 15 nm on the metallic underlayer while applying a negative bias voltage of 200 V to the substrate. Then, a hydrogen-containing carbon protective layer having a thickness of 20 nm was formed on the magnetic layer and finally a lubricant layer of an adsorptive perfluoroalkyl polyether, etc. was formed on the protective layer.

The magnetic recording medium produced above was subjected to X-ray diffraction analysis. Resultantly, it was confirmed that the crystals in the metallic underlayer had grown in an orientation such that the (110) crystal lattice plane of the body centered cubic structure became approximately parallel to the substrate plane. In the magnetic layer, the crystals had oriented themselves such that the (100) plane of the hexagonal structure became approximately parallel to the substrate plane. The average roughness factor Ra of the protective layer surface determined in the radial direction was 0.8 nm. The average roughness factor Ra of the magnetic layer from which the protective layer had been removed was 0.5 nm as determined in the radial direction.

Using this magnetic recording medium, an MR head was seeked 100,000 times from the inner periphery to the outer periphery of the magnetic recording medium at a head flying height of 0.06 μm. Resultantly, it was confirmed that no contact of the head with the magnetic recording medium occurred.

Figure 4:
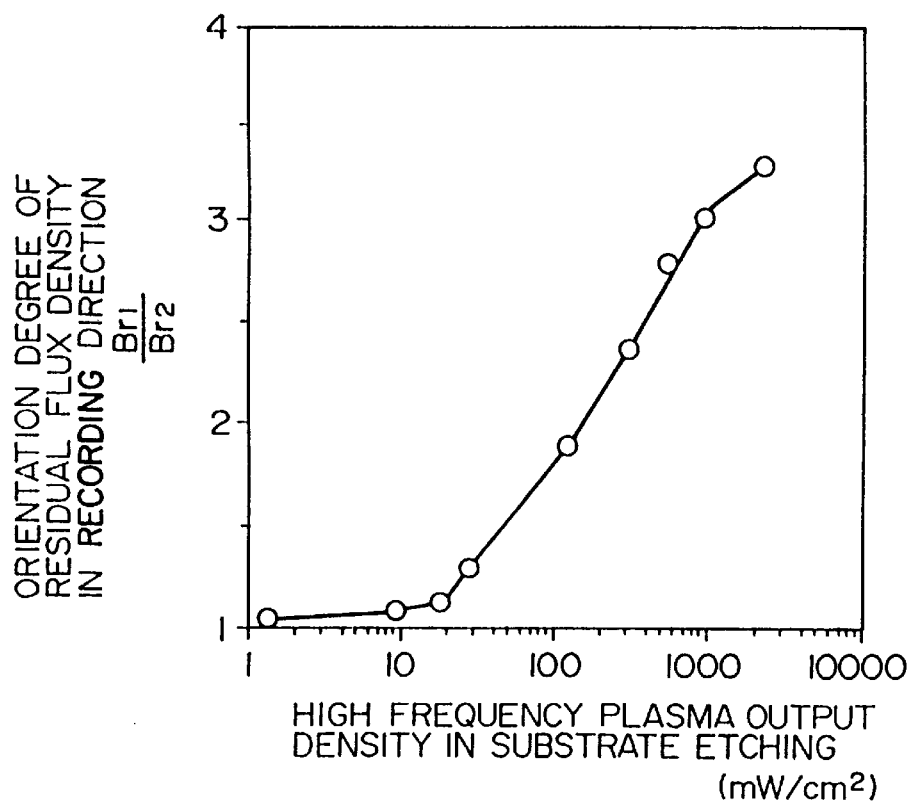
FIG. 4 is a graph showing the relationship between the plasma output density in the plasma etching of the substrate surface of a thin film magnetic recording medium and the recording direction orientation ratio $Br_1/Br_2$ of the residual flux density.

The magnetostatic properties and the read/write characteristics, when using an MR head, of the magnetic recording medium produced were determined in the same manner as in Example 1. FIG. 4 shows the relationship between the plasma output density in plasma etching of the substrate surface and the recording direction orientation ratio of residual flux density, $Br_1/Br_2$. When the plasma output density was not less than 30 mW/cm² and not more than 1000 mW/cm², $Br_1/Br_2$ had values not less than 1.3 and not more than 3.

Figure 5:
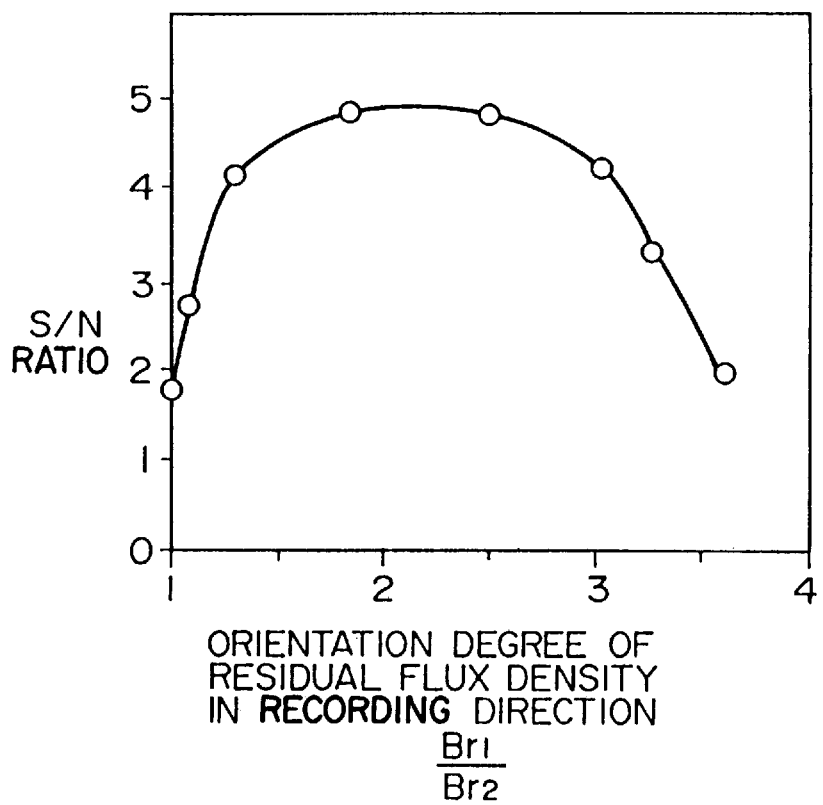
FIG. 5 is a graph showing the relationship between the recording direction orientation ratio $Br_1/Br_2$ of the residual flux density of a thin film magnetic recording medium whose substrate surface has been subjected to plasma etching and the S/N ratio of the medium determined by using an MR head.

Further, magnetic recording media having a value of the product $Br_1\delta$ of the residual flux density $Br_1$ of the magnetic layer determined in the recording direction and the layer thickness δ of not less than 50 Gμm and not more than 100 Gμm were prepared by varying the composition and the layer thickness of the magnetic layer. In this case, plasma etching of the substrate surface was conducted at an output density of 150 mW/cm² and a bias voltage not less than 10 V and not more than 500 V was applied at the time of film formation. Resultantly, when the magnetic layer thickness was not less than 5 nm and not more than 60 nm, the coercivity Hc determined in the recording direction was not less than 1800 Oe and not more than 3500 Oe. FIG. 5 shows the relationship between the S/N ratio of these magnetic recording media at 120 kBPI and 5 kTPI determined by using an MR head at a head flying height of 0.06 μm and a recording direction orientation ratio $Br_1/Br_2$ of residual flux density. When the value of $Br_1/Br_2$ was not less than 1.3 and not more than 3, an improved S/N ratio of 4 or more was obtained.

The above-mentioned effects were also observed with a Ti substrate, Si substrate and chemically strengthened glass substrate.

EXAMPLE 3

A plurality of substrates having an outside diameter of 65 nm, inside diameter of 20 mm and thickness of 0.3 mm and comprising carbon were prepared, and both sides were smoothly polished by using a lapping machine until the average roughness factor Ra reached 0.8 nm, then washed and dried. Thereafter, polishing tapes were pressed against both sides of the substrate through contact rolls by using a tape polishing machine in the presence of an abrasive material having an average grain diameter of 0.2 μm or less while rotating the substrate, to form texture grooves having irregular depth and density in the recording direction. The values of the average roughness factor Ra of the substrate surface determined in the radial direction was 0.3 nm and the average density N of grooves having a depth not less than 1 nm and not more than 50 nm in a distance of the radial direction of 1 μm was 3.5.

The substrate was maintained under vacuum in a sputtering apparatus by using a vacuum pump having a pumping speed of water vapor per vacuum chamber volume of 300 l/sec or more, heated up to 400° C., and subjected to plasma etching at an argon pressure of 5 mTorr and a frequency of 13.56 MHz. The plasma output density was 50 mW/cm$^2$ and the etching film thickness was 2 nm or less.

Thereafter, Ni-10B was formed into a film 20 nm in thickness at an argon pressure of 5 mTorr as the first metallic underlayer. Then, Cr, Mo, W, Nb, Ta or an alloy comprising at least one of these as the main component was formed into a film having a thickness not less than 5 nm and not more than 500 nm as the second metallic underlayer. On the composite metallic underlayer prepared above was formed a two-layer structure Co—Cr—Pt—Si magnetic layer (Br=3.5 kG) with a non-magnetic intermediate layer comprising at least one member selected from the group consisting of Cr, Mo, W, V, Ta, Nb, Zr, Ti, B, Be, C, Ni—P and Ni—B placed between the layers, in the same manner as in Example 1. In this case, the value of $Br_1\delta$ was changed by varying the total magnetic layer thickness δ. Thereafter, a protective layer of carbon and a lubricant layer were formed in the same manner as in Example 1.

The magnetic recording medium prepared in the manner described above was subjected to X-ray diffraction analysis. Resultantly, it was confirmed that in the second underlayer the crystals had grown in an orientation such that the (200) crystal lattice plane of the face centered cubic structure became approximately parallel to the substrate plane. In the magnetic layer, the crystals had oriented themselves such that the (110) plane of the hexagonal structure was approximately parallel to the substrate plane. The average roughness factor Ra of the protective layer surface determined in the radial direction was 0.5 nm. The average roughness factor Ra of the magnetic layer after the protective layer had been removed therefrom was 0.7 nm as determined in the radial direction.

Using this magnetic recording medium, an MR head was seeked 100,000 times from the inner periphery to the outer periphery of the medium at a head flying height of 0.06 μm, to confirm that no contact of the head with the magnetic recording medium occurred. Table 1 shows the relationship between the intermediate layer film thickness of a magnetic recording medium prepared by using Ni—B as the first metallic underlayer and the Br orientation ratio and the S/N ratio determined under conditions of 160 kBPI, 6 kTPI and a head flying height of 0.05 μm.

TABLE 1

| | Second metallic underlayer | | Intermediate layer | | | Orientation ratio $Br_1Br_2$ | Hc (Oe) | Read/write S/N ratio | Overwrite characteristic (dB) |
|---|---|---|---|---|---|---|---|---|---|
| Sample | Composition | Film thickness (nm) | Composition | Film thickness (nm) | Brδ (Gμm) | | | | |
| 1 | Cr | 500 | Cr | 0.5 | 180 | 1.3 | 2500 | 4.5 | 33 |
| 2 | Cr | 500 | Cr | 1.0 | 150 | 1.5 | 2800 | 4.4 | 32 |
| 3 | CrTi | 100 | Cr | 2.5 | 160 | 2.3 | 3500 | 4.4 | 33 |
| 4 | Mo | 150 | V | 1.5 | 120 | 1.9 | 1870 | 4.1 | 40 |
| 5 | W | 10 | Ta | 4.5 | 150 | 2.4 | 1800 | 4.0 | 40 |
| 6 | Nb | 5.0 | W | 1.2 | 70 | 3.0 | 1700 | 5.0 | 42 |
| 7 | CrTi | 50 | Cr | 3.6 | 50 | 1.4 | 3000 | 5.1 | 30 |
| 8 | Ta | 5.0 | Zr | 1.0 | 60 | 1.5 | 1600 | 5.0 | 45 |
| 9 | CrPt | 200 | Ti | 1.5 | 80 | 1.8 | 2200 | 4.7 | 35 |
| 10 | CrPd | 5 | B | 1.0 | 100 | 1.6 | 2300 | 4.5 | 34 |
| 11 | CrSi | 10 | Be | 2.5 | 55 | 3.0 | 2250 | 5.4 | 33 |
| 12 | CrFe | 50 | C | 5.0 | 68 | 1.8 | 2500 | 5.3 | 33 |
| 13 | CrP | 80 | NiP | 1.0 | 180 | 2.4 | 2200 | 4.3 | 34 |
| 14 | Cr | 10 | Mo | 5.0 | 5 | 2.8 | 1400 | 5.5 | 38 |
| 15 | CrTi | 50 | Nb | 2.0 | 8 | 2.5 | 1600 | 5.4 | 39 |
| 16 | CrB | 100 | NiB | 2.0 | 10 | 2.9 | 1700 | 5.3 | 38 |

In Table 1, the composition of the second metallic underlayers is $Cr_{90}Ti_{10}$ in samples 3 and 7, $Cr_{90}Pt_{10}$ in sample 9, $Cr_{90}Pd_{10}$ in sample 10, $Cr_{95}Si_5$ in sample 11, $Cr_{90}Fe_{10}$ in sample 12, $Cr_{90}Pd_{10}$ in sample 13, $Cr_{85}T_{15}$ in sample 15 and $Cr_{90}B_{10}$ in sample 16. The intermediate layer composition is $Ni_{80}P_{20}$ in sample 13 and $Ni_{90}B_{10}$ in sample 16.

Magnetic recording media of comparative examples were prepared, and their characteristic properties were determined in the same manner as described above. The results obtained are shown in Table 2. In Table 2, the composition of the second metallic underlayer of sample c is $Cr_{90}T_{10}$, those of samples e and f are $Cr_{85}Ti_{15}$, and the intermediate layer composition of sample d is $Cr_{90}Ti_{10}$. Samples a to d are magnetic recording media prepared by decreasing the average density N of grooves provided on the substrate surface to make the orientation ratio smaller than in the examples of the present invention, and sample g is a medium prepared by increasing the density N to make the orientation ratio larger than in the examples of the present invention. Samples e and f are magnetic recording media prepared by changing the total magnetic layer thickness δ to make the value of $Br_1\delta$ different from the values of the examples of the present invention. Samples h and i are magnetic recording media wherein the intermediate layer thickness was varied from the values of the examples of the present invention.

TABLE 2

| Sample | Second metallic underlayer Composition | Second metallic underlayer Film thickness (nm) | Intermediate layer Composition | Intermediate layer Film thickness (nm) | Br$\delta$ (G$\mu$m) | Orientation ratio Br$_1$Br$_2$ | Hc (Oe) | Read/write S/N ratio | Overwrite characteristic (dB) |
|---|---|---|---|---|---|---|---|---|---|
| a | Cr | 600 | — | 0 | 220 | 1.1 | 2000 | 1.0 | 35 |
| b | Cr | 2.0 | Cr | 2.0 | 190 | 1.2 | 1500 | 2.1 | 40 |
| c | CrTi | 600 | — | 0 | 200 | 1.0 | 3600 | 1.5 | 10 |
| d | Cr | 0 | CrTi | 0.2 | 250 | 1.0 | 1600 | 0.9 | 40 |
| e | CrTi | 50 | Cr | 1.5 | 4 | 1.3 | 1000 | 2.3 | 38 |
| f | CrTi | 50 | Cr | 1.5 | 181 | 1.7 | 1700 | 2.8 | 37 |
| g | Cr | 50 | Cr | 1.5 | 100 | 3.1 | 2250 | 2.7 | 33 |
| h | Cr | 50 | Cr | 6.0 | 100 | 2.8 | 2150 | 2.6 | 32 |
| i | Cr | 50 | Cr | 0.4 | 100 | 2.5 | 2000 | 2.5 | 32 |

As compared with the media of the comparative examples, the magnetic recording media of the examples of the present invention had a high S/N ratio of more than 3 when the intermediate layer thickness was not less than 0.5 nm and not more than 5 nm, the value of Br$_1$/Br$_2$ was not less than 1.3 and not more than 3 and Br$_1\delta$ was not less than 5 G$\mu$m and not more than 180 G$\mu$m. Among the examples of the present invention, when the coercivity was not less than 1800 Oe and not more than 3500 Oe, the magnetic recording media had an S/N ratio of 4 or more, and when Br$_1\delta$ was not less than 5 G$\mu$m and not more than 70 G$\mu$m they had an S/N ratio of 5 or more. The magnetic recording medium of the comparative example wherein the coercivity was 3600 Oe showed an overwrite characteristic of 10 dB, and thus cannot be used in practice.

Such effects were also observed when Zr, Si, Ti, Sc, Al, C, Ge, Sb, Ga, Ru, Pd, V, Nb, Hf, Rh, Ni—P, or an alloy thereof was used as the first metallic underlayer.

EXAMPLE 4

Figure 6:
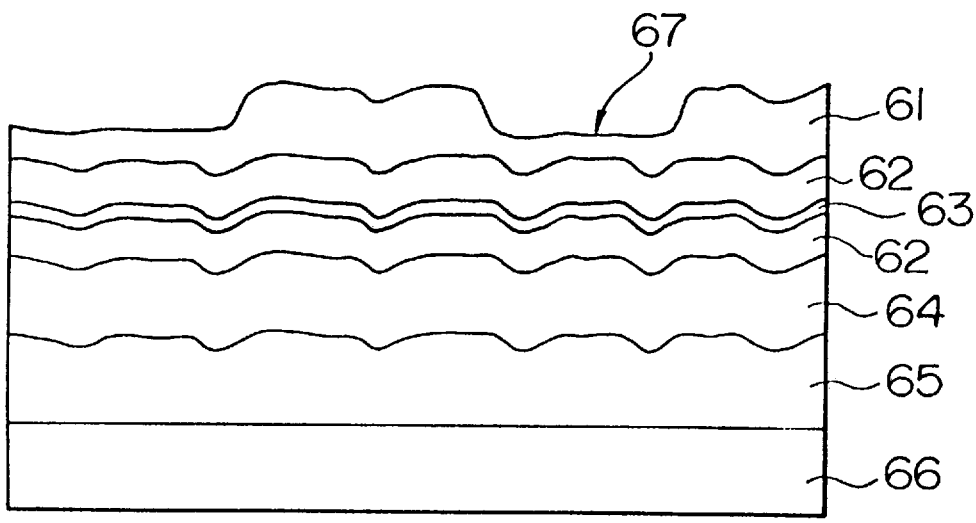
FIG. 6 is a partial sectional view showing the structure of a thin film magnetic recording medium according to one embodiment of the present invention.

A magnetic recording medium was prepared in the same manner as in Example 3 except that, before forming a lubricant layer, a particle mask having openings with a pitch of not less than 1 $\mu$m and not more than 100 $\mu$m was placed on the hydrogen-containing carbon protective layer and thereafter the portion of the carbon protective layer not covered by the mask was etched to a depth not less than 1 nm and not more than 20 nm by oxygen plasma etching so that the protective layer might have a surface roughness different from that of the magnetic layer surface. FIG. 6 is a schematic partial sectional view of the magnetic recording medium thus obtained. As shown in FIG. 6, unevenness has been formed on the surface of the two metallic underlayers 64 and 65 provided on the substrate 66. Thereon has been provided a magnetic layer consisting of two layers 62 with an intermediate layer 63 placed therebetween, and an unevenness of approximately the same shape as the aforesaid unevenness has been also formed on the surface of the magnetic layer. On the surface of the protective film 61, on the other hand, there has been formed, besides the aforesaid unevenness, an unevenness due to etched parts 67 having a pitch not less than 1 $\mu$m and not more than 100 $\mu$m. After forming the etched part as described above, a lubricant layer was formed.

The magnetic recording medium thus prepared was examined for a head flying property, circumferential orientation of magnetic properties and S/N ratio. The read/write characteristic was about the same as that of the magnetic recording medium of Example 3. When the head was floated by the load-unload method, the magnetic recording medium wherein the carbon protective layer surface had been etched to a depth of 5–20 nm showed the same sliding resistance reliability as in Example 3, but when the head was floated by the contact start/stop method, it showed a reduced sticking of the head and thus had an improved reliability relative to the magnetic recording medium of Example 3.

Similar effects were also observed when i-C (ion assisted deposited carbon), WC, (W—Mo)—C, (Nb—Zr)—N, MOS$_2$, Si$_3$N$_4$, SiO$_2$, ZrO$_2$, Rh, B$_4$C or B was used as the protective layer.

EXAMPLE 5

Figure 7A:
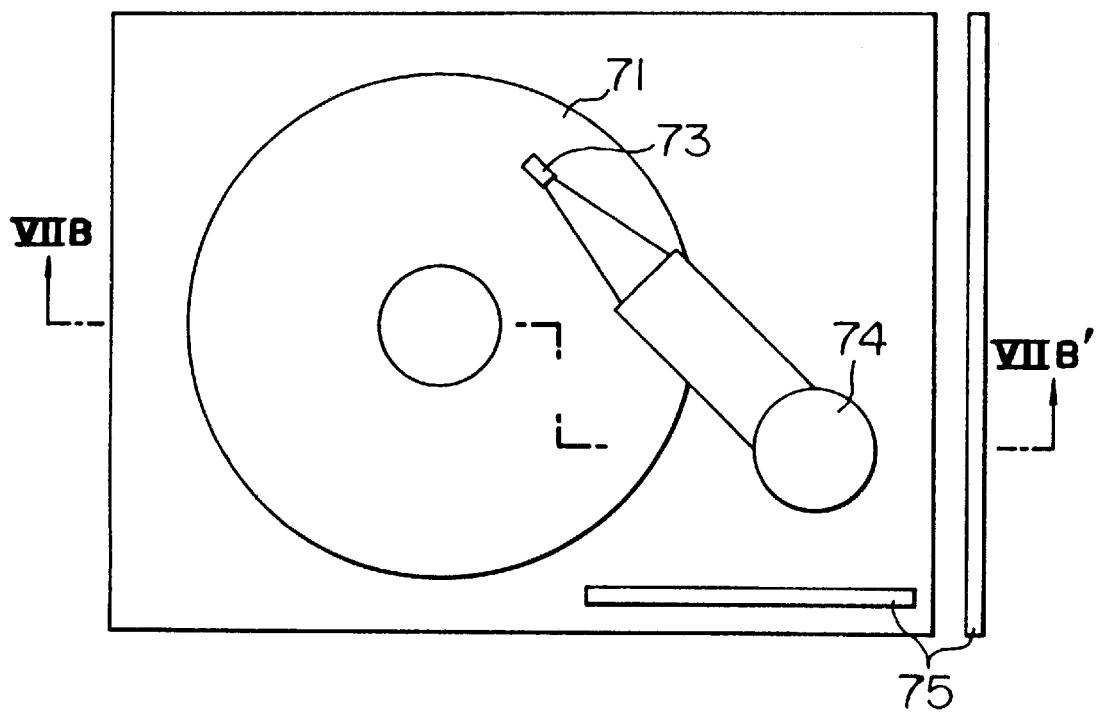
FIG. 7A and FIG. 7B are respectively a plan view and a sectional view of a magnetic recording system according to one embodiment of the present invention.
Figure 7B:
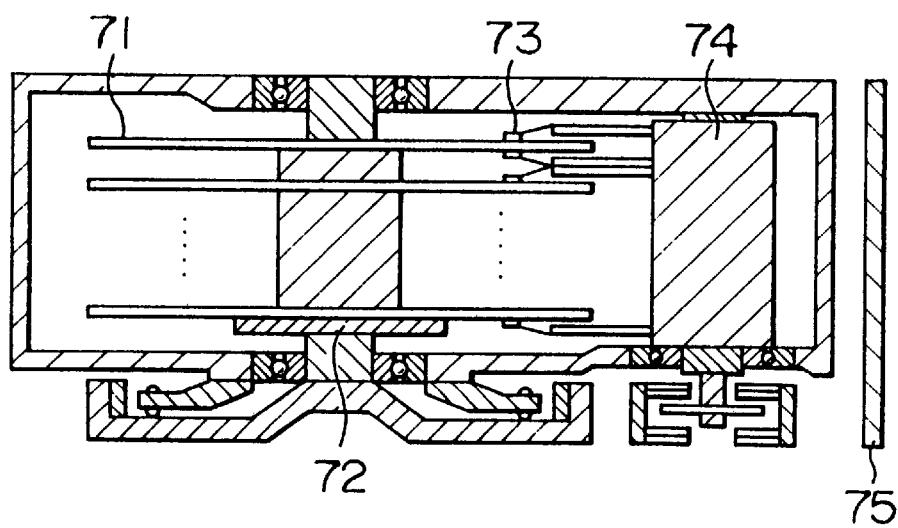

A plan view of a magnetic recording system of one embodiment of the present invention is shown in FIG. 7A and a sectional view thereof taken along the line VIIB–VIIB' in FIG. 7A is shown in FIG. 7B. Four sheets of any one of the magnetic recording media (71) prepared in Examples 1 to 4 were used in combination with seven composite type thin film magnetic heads 73 using a Co—Ni—Fe or Co—Ta—Zr alloy for the writing magnetic pole material and having an MR sensor as the reading part and with a thin film magnetic head constituting a servo head using a Ni—Fe alloy for the reading-writing magnetic pole. By using the aforesaid magnetic recording medium and by driving the magnetic recording medium driving part 72 in a recording direction (i.e. a track direction) under conditions varied depending on the properties of the thin film magnetic heads 73, such as their weight and the shape of their slider, etc., a head flying height not less than 0.02 $\mu$m and not more than 0.1 $\mu$m could be attained. In FIGS. 7A and 7B, 74 is a magnetic head driving part for driving the magnetic heads 73 in a track seeking direction substantially perpendicular to the recording direction (i.e. the track direction) and 75 is a read/write signal processing system.

Using this magnetic recording system under a condition of a head flying height of 0.08 $\mu$m, the time until occurrence of an error was determined. Resultantly, it could be demonstrated that the reliability of the system was very high. Further, since this magnetic recording system can operate at a low head flying height, it has a wider phase margin in recording and read back of signals and can increase the surface recording density to twice the density obtainable when the magnetic recording medium of the comparative example is used at a flying height of 0.12 μm. Thus, a small-sized, large capacity magnetic recording system was obtained.

By using this magnetic recording system and by reading back with an MR head having a track width of 5 μm or less, a large capacity magnetic recording system was obtained which had an S/N ratio of 4 or more at a high recording density of 100 kBPI or more and an overwrite (O/W) characteristic of 26 dB or more. Particularly, at a high recording density, a high S/N ratio was obtained with the magnetic recording media of the above-mentioned examples of the present invention because these media permit sufficient side writing in the track width direction. Further, since the texture size on the substrate surface is small, the quality of servo signals was high and a good head positioning was possible.

Although the above description relates to a case wherein a thin film magnetic head using a Co—Ni—Fe or Co-Ta—Zr alloy as the magnetic pole material was used, it was confirmed that similar effects were also obtainable when a dual thin film magnetic head using as the recording magnetic pole material a Ni—Fe or Fe—Al alloy magnetic layer or a multi-layer magnetic layer comprising such layers, a dual composite magnetic head of metal-in-gap (MIG) type provided with a Co—Ta—Zr alloy, Fe—Al—Si alloy, etc. at the gap part, and further an inductive thin film head or MIG head, were used.

According to the present invention, a magnetic recording medium which is adapted for an MR head having a high read back efficiency and provides a high S/N ratio and a large width of side-writing band can be obtained. When the unevenness of the surface of the magnetic layer and the protective layer formed thereon is properly controlled, a flying height of an MR head not less than 0.02 μm and not more than 0.1 μm can be attained. Furthermore, a process for producing such a magnetic recording medium with ease and a small-sized, large capacity magnetic recording system which uses the magnetic recording medium can be provided.

The second aspect of the present invention is described in detail below with reference to examples.

Figure 8:
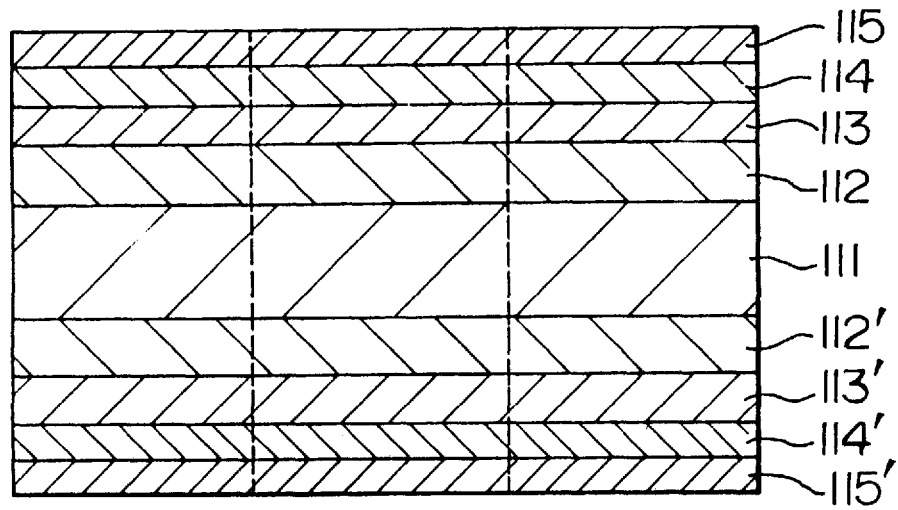
FIG. 8 is a sectional view showing the structure of a thin film magnetic recording medium according to the present invention.

FIG. 8 is a schematic sectional view showing the structure of a thin film medium according to the present invention. In FIG. 8, 111 is a substrate comprising Al—Mg alloy, chemically strengthened glass, organic resin, Ti, Si, carbon or ceramics such as $TiO_2$, SiC, etc., and 112 and 112' are non-magnetic plated layers formed on both sides of the substrate 111 and comprising Ni—P, Ni—W—P, etc. When Al—Mg alloy is used for a substrate, a substrate provided with such plated layers is preferably used; but 112 and 112' are not indispensable for other substrates. Symbols 113 and 113' are each a metallic underlayer formed of an alloy comprising Cr, Mo, W, V, Ta, Nb, Zr, Ti, B, Be, C, Ni—P or Ni—B as the main component; 114 and 114' are each a magnetic metal layer comprising Co—Ni, Co—Cr, Co—Fe, Co—Mo, Co—W, Co—Pt, Co—Re, Co—P, Co—Ni—Pt, Co—Cr—Ta, Co—Cr—Pt, Co—Ni—Cr, Co—Cr—Al, Co—Cr—Nb, Co—Ni—P, Co—Cr—Si, or the like formed on said underlayer; and 115 and 115' are each a non-magnetic protective layer comprising carbon, WC, (W—Mo)—C, (W—Zr)—C, SiC, (Zr—Nb)—N, $Si_3N_4$, $SiO_2$, $ZrO_2$, boron, $B_4C$, MoS, Rh or the like formed on said magnetic layer.

EXAMPLE 6

On both sides of a disk substrate having an outside diameter of 95 mm, inside diameter of 25 mm and thickness of 0.8 mm and comprising Al-4Mg (the numeral before the element symbol indicates the content of the relevant material in % by weight) were formed plated layers comprising Ni-12P (% by weight) with a film thickness of 13 μm. The surface of the non-magnetic substrate was smoothly polished by using a lapping machine until the average roughness factor Ra reached 0.3 nm, then washed and dried. Thereafter, by using a tape polishing machine, polishing tapes were pressed against both sides of the disk substrate through contact rolls in the presence of an abrasive material having an average grain diameter of 0.5 μm while rotating the disk substrate, to form texture grooves having irregular depth and density in the recording direction on the substrate surface. Then the substrate was cleaned of the abrasive material and other dirt adhered thereto by washing and dried. The average roughness factor Ra of grooves on the substrate surface determined in the radial direction was 0.7 nm and the average density of grooves having a depth not less than 1 nm and not more than 50 nm in a distance in a direction approximately perpendicular to the recording direction of 1 μm was 20.

Figure 9:
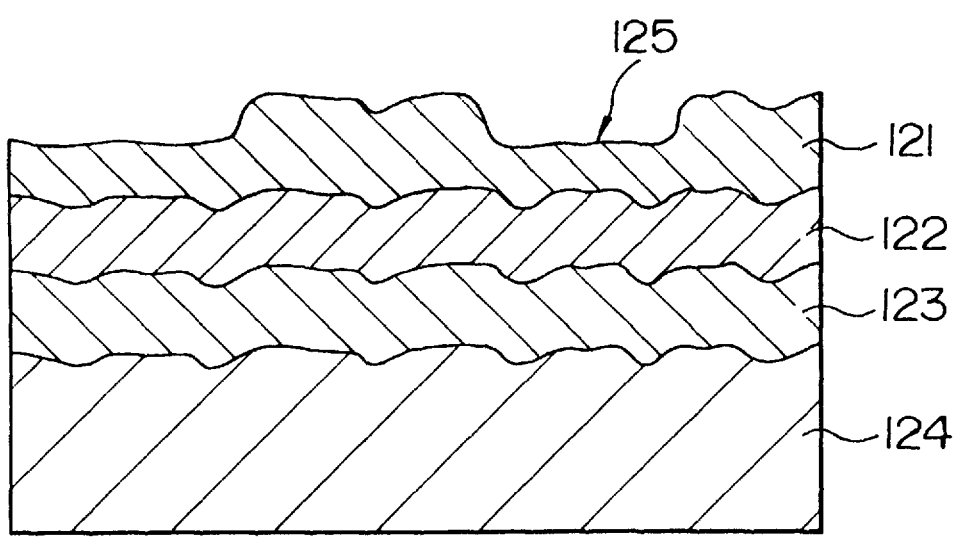
FIG. 9 is a sectional view showing the structure of a thin film recording medium according to one embodiment of the present invention.

Referring to FIG. 9, a disk substrate 124 was maintained under a degree of vacuum of 2 mTorr in a sputtering apparatus by using a vacuum pump having a pumping speed of water vapor per vacuum chamber volume of 200 l/sec or more, heated to 250° C., and a Cr underlayer 123 having a layer thickness of 50 nm was formed under an argon pressure of 0.5 mTorr. On the underlayer was formed a Co-17Cr-5Ta (% by atoms) alloy-based magnetic layer 122 with a thickness of 5–30 nm. Further, a particle mask having openings with a pitch of not less than 1 μm and not more than 100 μm was provided on the protective layer surface. Thereafter, the portion of the protective layer not covered by the mask was etched by oxygen plasma etching to a depth not less than 1 nm and not more than 20 nm, so that the protective layer might have a surface roughness different from that of the magnetic layer surface.

Resultantly, as shown in FIG. 9, an unevenness due to etched parts 125 having a pitch not less than 1 μm and not more than 100 μm was formed on the carbon protective layer surface. Then, a lubricant layer of adsorptive perfluoroalkyl polyether, etc. was formed on the protective layer.

The magnetostatic properties (Hc, Br, $H_k$) of the medium obtained were determined with a vibration sample magnetometer (VSM) and a torque magnetometer. As regards the read/write characteristics, the value of the read/write S/N ratio at a linear recording density of 150 kBPI was determined by using a composite thin film magnetic head having a GMR sensor as the reading part at a head flying height of 0.06 μm, effective gap length of 0.4 μm and track width of 2 μm.

Media of the above-mentioned structure were prepared in which the product Brδ of the residual flux density Br of the medium magnetic layer determined in the recording direction and the magnetic layer thickness δ was made to have a value not less than 5 Gμm and not more than 79 Gμm by regulating the layer thickness δ, and $H_k$ was varied from 5 kOe to 30 kOe by controlling the evacuation speed of the film-forming chamber and the film-forming speed of the underlayer and magnetic layer and controlling the direct current bias voltage of the substrate side in film formation in the range of −10 V to −500 V.

Figure 10:
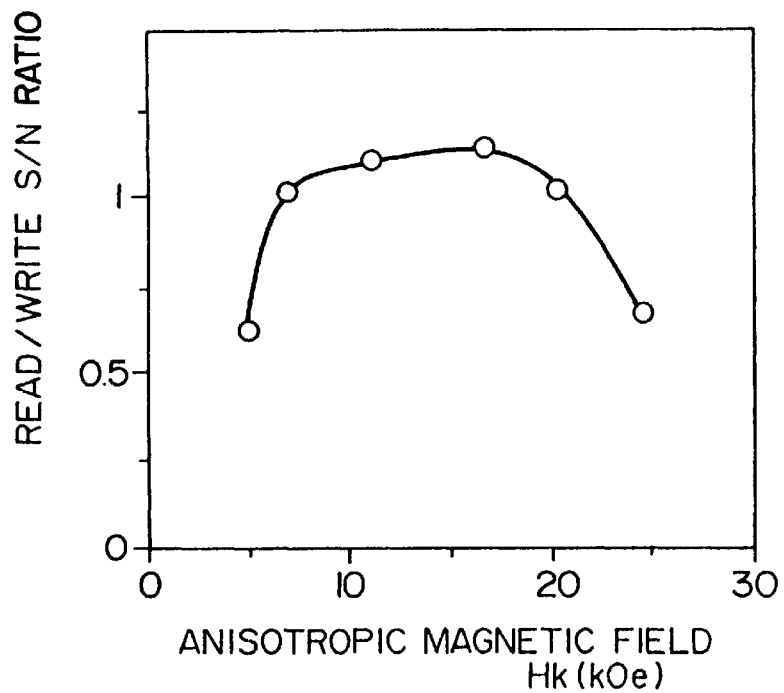
FIG. 10 is a graph showing the relationship between the anisotropic magnetic field $H_k$ of the thin film magnetic recording medium according to one embodiment of the present invention and the S/N ratio thereof in recording and reading.

FIG. 10 shows the relationship between $H_k$ and the S/N ratio at the time of recording and reading. It was confirmed that an S/N ratio of 1 or more could be attained in a range of $H_k$ not less than 7 kOe and not more than 20 kOe. The coercivity Hc determined in the recording direction at this time was not less than 1000 Oe and not more than 3500 Oe.

The magnetic recording medium prepared as described above was subjected to X-ray diffraction analysis. As the result, it was confirmed that in the Cr underlayer the crystals had grown in an orientation such that the (200) crystal lattice plane of the body centered cubic structure had become approximately parallel to the substrate plane. In the magnetic layer, the crystals had oriented themselves such that the (110) plane of the hexagonal structure had become approximately parallel to the disk substrate surface and the c-axis had become approximately parallel to the disk substrate surface. It was also confirmed that the total concentration of oxygen, carbon and nitrogen in the magnetic layer was 1% by atoms or less.

Using a medium in which the average roughness factor Ra of the protective layer surface determined in the radial direction was regulated to a range not less than 0.3 nm and not more than 3 nm and the average roughness factor Ra of the magnetic layer was regulated to a range not less than 0.3 nm and not more than 1.9 nm by controlling the abrasive grain diameter and processing time in forming the texture of the substrate, an MR head was seeked 100,000 times from the inner periphery to the outer periphery of the medium at a flying height of 0.06 $\mu$m. Resultantly, it was confirmed that no contact of the head with the medium occurred.

The above-mentioned effects were similarly observed also when Co-10Ni-10Cr (% by atoms), Co-40NiO5Zr (% by atoms) or Co-30Ni-10Pt (% by atoms) was used for the magnetic material. Further, it was confirmed that when the magnetic layer was directly formed on the substrate without forming the underlayer, the coercivity was 100–200 Oe lower than when the underlayer was formed, but the S/N ratio was 1 or more.

When the magnetic layer was made in a two-layer structure with a non-magnetic intermediate layer having a layer thickness not less than 0.5 nm and not more than 5 nm and comprising one member selected from the group consisting of Cr, Mo, W, V, Ta, Nb, Zr, Ti, B, Be, C, Ni—P and Ni—B placed therebetween, the medium noise decreased to about ⅔ of that of the single-layer magnetic layer and the value of the S/N ratio improved further.

EXAMPLE 7

The surface of a canasite glass substrate 65 mm in outside diameter, 20 mm in inside diameter and 0.3 mm in thickness was smoothly polished by using a lapping machine until the average roughness factor Ra reached 0.3 nm, then washed and dried. The disk substrate was maintained under vacuum in a sputtering apparatus by using a vacuum pump having a pumping speed of water vapor per vacuum chamber volume of 400 l/sec or more, heated up to a substrate temperature of 400° C., then, under an argon pressure of 5 mTorr, a Ti layer was formed with a thickness of 20 nm as the first underlayer and then a Cr-15Ti (% by atoms) alloy layer was formed with a thickness of 50 nm as the second underlayer. On the composite underlayer thus obtained was formed a Co—Cr—Pt—Si magnetic layer 10 nm in thickness. At this time, 300 W of a high frequency bias voltage of 13.56 MHz was applied to the substrate side. The direct current component of the bias voltage was −300 V and the value of Brδ was 25 G$\mu$m.

The grain boundary width of the magnetic layer crystal observed with a high resolution transmission electron microscope was controlled in a range not less than 0.1 nm and not more than 10 nm by controlling the concentration of Cr, Pt and Si added into the magnetic layer in a range not less than 5% by atoms and not more than 20% by atoms. At this time, the value of Brδ was not less than 5 G$\mu$m and not more than 30 G$\mu$m, and the value of H$_k$ was not less than 7 kOe and not more than 20 kOe.

Figure 11:
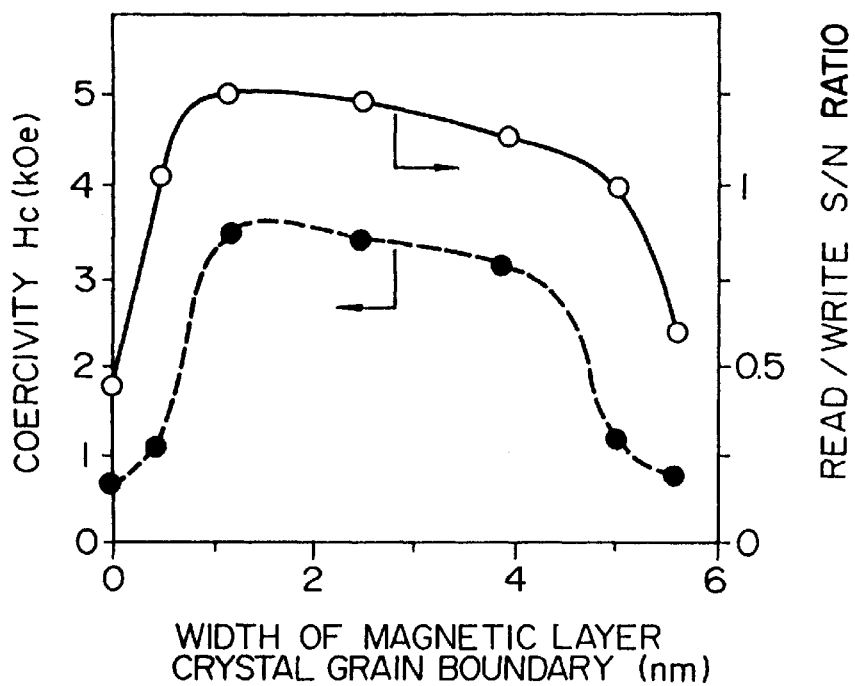
FIG. 11 is a graph showing the relationship between the grain boundary width of the magnetic layer crystal of a thin film magnetic recording medium of one embodiment of the present invention and the coercivity Hc and the S/N ratio thereof in recording and reading.

FIG. 11 shows the relationship between the grain boundary width of the magnetic layer crystal and the coercivity Hc and the read/write S/N ratio at a head flying height of 0.03 Mm and a linear recording density of 200 kBPI. When the grain boundary width was not less than 0.5 nm and not more than 5 nm, good properties of Hc of not less than 1000 Oe and not more than 3500 Oe and an S/N ratio of 1 or more were exhibited.

X-ray diffraction analysis of the magnetic recording medium prepared according to the method of the present example confirmed that, in the Cr underlayer, the crystals had grown in an orientation such that the (110) crystal lattice plane of the body centered cubic structure had become approximately parallel to the substrate plane. In the magnetic layer, the crystals had oriented themselves such that the (100) plane of the hexagonal structure had become approximately parallel to the disk substrate surface. The average roughness factor Ra of the protective layer surface was 1.0 nm and the average roughness factor Ra of the magnetic layer surface was 0.9 nm.

Using the medium of the present example, a GMR head was seeked 100,000 times from the inner periphery to the outer periphery of the medium at a flying height of 0.03 $\mu$m. Resultantly, it was confirmed that no contact of the head with the medium occurred.

Similar effects to those described above were observed also when Zr, Si, Sc, Al, C, Ge, Sb, Ga, Ru, Pd, V, Nb, Ta, Hf, Rh, Ni—P, Ni—B or an alloy comprising at least one of these as the main component was used as the first underlayer.

EXAMPLE 8

The surface of a carbon substrate having an outside diameter of 48 mm, inside diameter of 12 mm and thickness of 0.3 mm was smoothly polished by using a lapping machine until the average roughness factor Ra reached 0.3 nm, then washed and dried. Thereafter, by using a tape polishing machine, polishing tapes were pressed against both sides of the disk through contact rolls in the presence of a diamond abrasive having an average grain diameter of 1 $\mu$m or less while rotating the disk substrate, to form texture grooves having irregular depth and density on the substrate surface. The substrate was then cleaned of abrasive and other dirt adhered thereto by washing and dried.

The average roughness factor Ra of grooves on the substrate surface determined in the radial direction was 0.5 nm, and the average density of grooves having a depth not less than 1 nm and not more than 50 nm in a distance in a direction approximately perpendicular to the recording direction of 1 $\mu$m was 50. The disk substrate was maintained under vacuum in a sputtering apparatus by using a vacuum pump having a pumping speed of water vapor per vacuum chamber volume of 500 l/sec or more, heated up to a substrate temperature of 400° C., and a Cr-15Ti underlayer was formed with a thickness of 10 nm under an argon pressure of 1 mTorr. Then a Co—Cr—Pt—Ta magnetic layer was formed with a thickness of 5 nm on the underlayer. The value of Brδ at this time was 10 G$\mu$m.

The direct current bias voltage in film formation was controlled in the range of −10 V to −500 V to vary the value of the ratio of the length c to the length a (namely c/a) of the lattice constant of the magnetic layer having a hexagonal structure and the Ar concentration in the underlayer and magnetic layer. At this time, the value of Brδ was not less than 5 Gμm and not more than 30 Gpm, and Hc was not less than 1000 Oe and not more than 3500 Oe.

Figure 12:
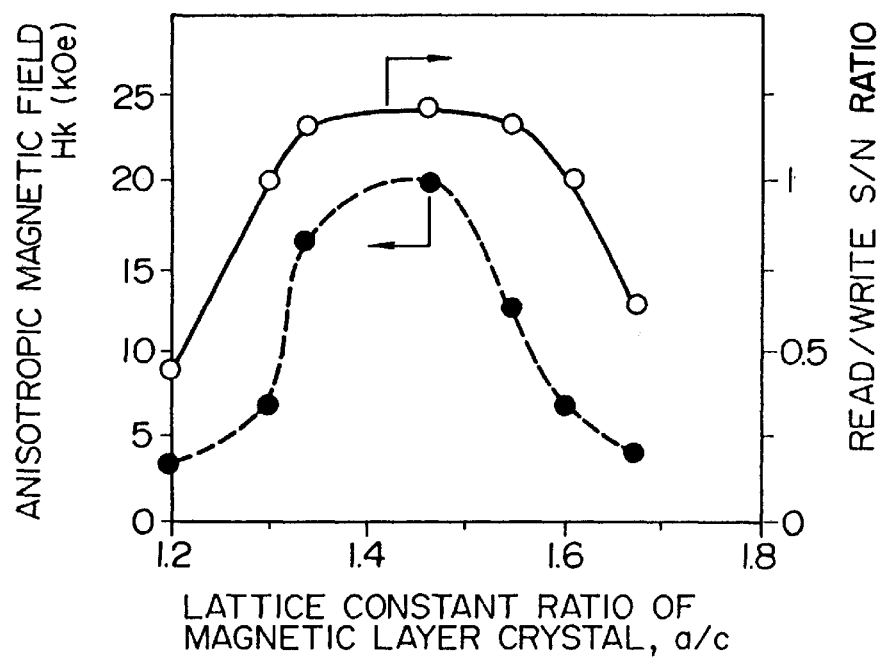
FIG. 12 is a graph showing the relationship between the lattice constant ratio c/a of the magnetic layer of a thin film magnetic recording medium according to one embodiment of the present invention and the anisotropic magnetic field $H_k$ and the S/N ratio thereof in recording and reading.

FIG. 12 shows the relationship between the lattice constant ratio c/a of the magnetic layer and $H_k$ and the value of the read/write S/N ratio at a head flying height of 0.03 μm and a linear recording density of 200 kBPI. Good properties of an $H_k$ value of not less than 7 kOe and not more than 20 kOe and an S/N ratio of 1 or more were exhibited when the lattice constant ratio c/a was not less than 1.3 and not more than 1.6. Still better properties of an $H_k$ value of not less than 8 kOe and not more than 20 kOe and an S/N ratio of 1.2 or more were exhibited when the Ar concentration in the underlayer and magnetic layer was not less than 0.01% by atoms and not more than 5% by atoms.

The magnetic recording medium prepared by the method of the present example was subjected to X-ray diffraction analysis. Resultantly, it was confirmed that, in the Cr underlayer, the crystals had grown in an orientation such that the (100) crystal lattice plane of the body centered cubic structure had become approximately parallel to the substrate plane. In the magnetic layer, the crystals had oriented themselves such that the (110) plane of the hexagonal structure had become approximately parallel to the disk substrate surface. The average roughness factor Ra of the protective layer surface was 1.0 nm and the average roughness factor Ra of the magnetic layer surface was 0.5 nm.

Using the medium of the present example, a GMR head was seeked 100,000 times from the inner periphery to the outer periphery of the medium at a flying height of 0.03 μm. Resultantly, it was confirmed that no contact of the head with the medium occurred.

The above effects were similarly observed also when an alloy underlayer comprising Cr, Mo, W, Nb or Ta as the main component and additionally at least one element selected from Pt, Pd, Si, Fe, V, Ru, P and B in an amount not less than 1% by atoms and not more than 30% by atoms was formed with a film thickness not less than 5 nm and not more than 500 nm.

EXAMPLE 9

The surface of a Si—C substrate having an outside diameter of 48 mm, inside diameter of 12 mm and thickness of 0.3 mm was smoothly polished by using a lapping machine until the average roughness factor Ra reached 0.3 nm, then washed and dried. The disk substrate was maintained under vacuum in a sputtering apparatus by using a vacuum pump having a pumping speed of water vapor per vacuum chamber volume of 500 l/sec or more, heated to a substrate temperature in the range of 100° C.–400 ° C., then a Ni—B layer was formed under a Xe pressure of 1 mTorr as the underlayer with a thickness of 50 nm and subsequently a Co—Ni—Pt—Ta magnetic layer was formed with a thickness of 10 nm. At this time, the value of the product of the residual flux density and the layer thickness, Brδ, was varied in a range not less than 1 Gμm and not more than 200 Gμm by changing the concentration of Pt and Ta in the magnetic layer in a range not less than 1% by atoms and not more than 30% by atoms, and the magnetic layer thickness in a range not less than 1 nm and not more than 40 nm.

Figure 13:
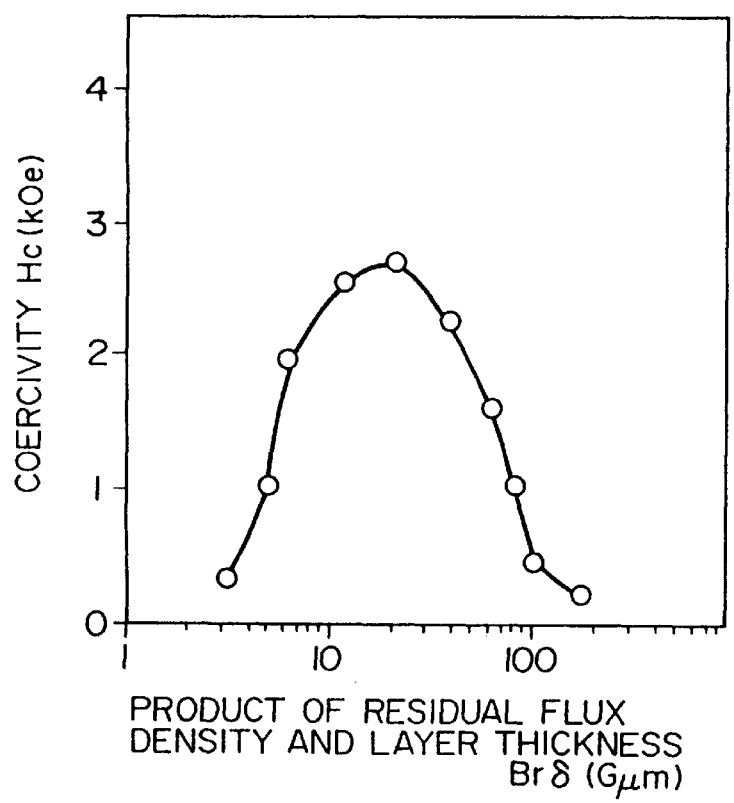
FIG. 13 is a graph showing the relationship between the residual flux density-layer thickness product $Br\delta$ of a thin film magnetic recording medium according to one embodiment of the present invention and the coercivity Hc thereof.

FIG. 13 shows the relationship between Brδ and the coercivity Hc. It can be seen that when Brδ was not less than 5 Gμm and less than 80 Gμm, Hc was not less than 1000 Oe and not more than 3500 Oe. The read/write S/N ratio at a head flying height of 0.02 μm and a linear recording density of 250 kBPI was 1 or more when Brδ was not less than 5 Gμm and less than 80 Gμm. Further, when Brδ was not less than 5 Gμm and not more than 30 Gμm, a markedly decreased medium noise and a high S/N ratio of 1.2 or more were attained.

Further, the direct current bias voltage in film formation was changed in the range of –10 V to –500 V to regulate the Xe concentration in the underlayer and the magnetic layer. Resultantly, when the Xe concentration was not less than 0.01% by atoms and not more than 5% by atoms, more enhanced properties of a value of $H_k$ of not less than 10 kOe and not more than 20 kOe and an S/N ratio of 1.5 or more were exhibited.

EXAMPLE 10

The surface of a $TiO_2$ substrate having an outside diameter of 65 mm, inside diameter of 20 mm and thickness of 0.3 mm was smoothly polished by using a lapping machine until the average roughness factor Ra reached 0.3 nm, then washed and dried. Then, by using a tape polishing machine, polishing tapes were pressed against both sides of the disk substrate through contact rolls in the presence of a diamond abrasive having an average grain diameter of 1 μm or less while rotating the disk substrate, to form texture grooves having irregular depth and density on the substrate surface. Then the substrate was cleaned of the abrasive and other dirt adhered thereto by washing and dried. The average roughness factor Ra of the substrate surface grooves determined in the radial direction was 0.7 nm and the average density of grooves having a depth not less than 1 nm and not more than 50 nm in a distance approximately perpendicular to the recording direction of 1 μm was 100.

The disk substrate was maintained under vacuum in a sputtering apparatus by using a vacuum pump having a pumping speed of water vapor per vacuum chamber volume of 500 l/sec or more, heated to a substrate temperature in the range of 100° C. to 400° C., then a Ru layer was formed with a thickness of 10 nm under a Kr pressure in the range of 0.1 mTorr to 5 mTorr as the first underlayer and then a Cr-5Si alloy layer was formed with a thickness of 10 nm as the second underlayer. On the composite underlayer thus obtained was formed a Co—Cr—Ta magnetic layer with a thickness of 5 nm. The value of Brδ at this time was 20 Gμm. The crystal lattice density of a face centered cubic lattice in the magnetic layer crystals was regulated by controlling the substrate temperature and the Kr partial pressure in film formation. The value of Hc at this time was not less than 1000 Oe and not more than 3500 Oe.

Figure 14:
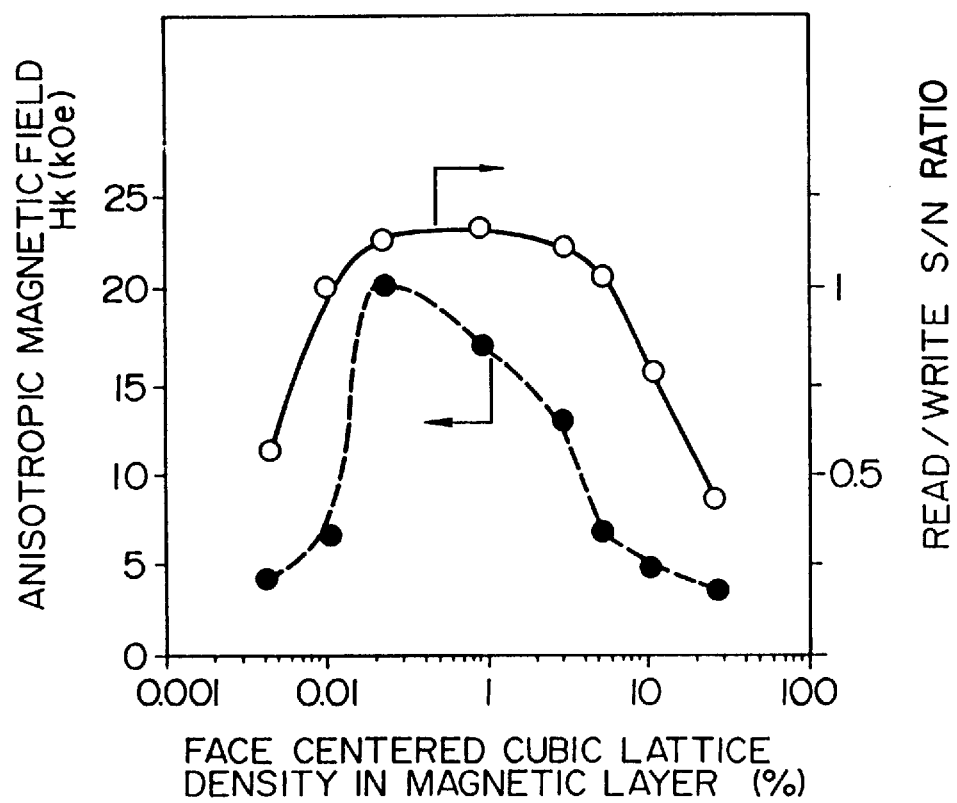
FIG. 14 is a graph showing the relationship between the density of the face centered cubic lattice type crystal lattice in the magnetic layer crystals of a thin film magnetic recording medium according to one embodiment of the present invention and the anisotropic magnetic field $H_k$ and the S/N ratio thereof in recording and reading.

FIG. 14 shows the relationship between the crystal lattice density of a face centered cubic lattice and $H_k$ and the value of read/write S/N ratio at a head flying height of 0.02 μm and a linear recording density of 250 kBPI. As the substrate temperature is increased and the Kr partial pressure is decreased at the time of film formation, the crystal lattice density of a face centered cubic lattice decreases and, at a crystal lattice density of a face centered cubic lattice not less than 0.01% and not more than 5%, the value of $H_k$ becomes not less than 7 kOe and not more than 20 kOe to exhibit a good S/N ratio of 1 or more. Further, as the result of regulating the Kr concentration in the underlayer and the magnetic layer by controlling the direct current bias voltage in film formation in the range of –10 V to –500 V, when the Kr concentration is not less than 0.01% by atoms and not more than 5% by atoms, the value of $H_k$ became not less than 10 kOe and not more than 20 kOe and a still better characteristic of an S/N ratio of 1.2 or more was exhibited.

The magnetic recording medium prepared by the method of the present example was subjected to X-ray diffraction analysis. As a result, it was confirmed that in the Cr—Si underlayer the crystals had grown in an orientation such that the (110) crystal lattice plane of the body centered cubic structure had become approximately parallel to the substrate plane. In the magnetic layer, the crystals had oriented themselves such that the (100) plane of the hexagonal structure had become approximately parallel to the disk substrate surface. The average roughness factor Ra of the protective layer surface was 1.0 nm and the average roughness factor Ra of the magnetic layer surface was 0.9 nm.

Using the medium of the present example, a GMR head was seeked 100,000 times from the inner periphery to the outer periphery of the medium at a flying height of 0.02 $\mu$m. As the result, it was confirmed that no contact of the head with the medium occurred.

The above-mentioned effects were similarly observed also when Zr, Si, Sc, Al, C, Ge, Sb, Ga, Ru, Pd, V, Nb, Ta, Hf, Rh, Ni—P, Ni—B or an alloy comprising at least one of these as the main component, such as Zr—Ta, Si—C, S—V, Al—Mg, V—Fe, Nb—Cr, Ta—Cr, Hf—Zr, Ta—Mo, etc. was used as the first underlayer.

EXAMPLE 11

A magnetic recording system was prepared on an experimental basis by using four sheets of a magnetic recording medium having properties equal to those of the media of examples 6 to 10 in combination with seven composite type thin film magnetic heads using a Co—Ni—Fe or Co—Ta—Zr alloy as the recording magnetic pole material and having a GMR element as the reading part, and a thin film head constituting a servo head using a Ni—Fe alloy as the reading and writing magnetic pole material. This system is constructed of, as shown in the plan view 7A and the sectional view 7B, a magnetic recording medium 71, magnetic recording medium driving part 72, magnetic head 73, magnetic head driving part 74 and read/write signal processing system 75.

By using this magnetic recording system, the average time until the occurrence of an error was determined to find that the time increased to 2–3 times that in the prior systems, demonstrating a very high reliability of the present system. Further, since the magnetic recording system prepared on an experimental basis in the present invention can operate at a low head flying height, it has a wider phase margin in signal recording and reading and can increase the surface recording density to 10 times the density obtainable when the medium of the comparative example is used at a flying height of 0.12 $\mu$m. Thus, a small-sized, large capacity magnetic recording system can be provided.

By using this system and by reading back with a GMR head having a track width of 2 $\mu$m or less, a large capacity magnetic recording system was obtained which had an S/N ratio of 1 or more at a high recording density of 200 kBPI or more and an overwrite (OW) characteristic of 26 dB or more. Particularly, even at a high recording density of 10 kTPI or more, a high S/N ratio was obtained with the medium of the present example, because it permits a sufficient width of side-writing band in the track width direction. Further, since the texture size on the substrate surface is small, the quality of servo signals was high and a good head positioning was possible. Similar effects were also obtained when a composite head was used as the servo head.

Although the above description relates to a case wherein a thin film magnetic head using a Co—Ni—Fe or Co—Ta—Zr alloy as the magnetic pole material was used, it was confirmed that similar effects were also obtainable when a dual type thin film magnetic head using as the recording magnetic pole material a Ni—Fe or Fe—Al alloy magnetic layer or a multi-layer magnetic layer comprising such layers, or a dual composite magnetic head of metal-in-gap (MIG) type provided with a Co—Ta—Zr alloy, Fe—Al—Si alloy, etc. at the gap part, and further an inductive thin film head or MIG heads, were used.

According to the present invention, a magnetic recording medium which is adapted for a GMR head having a high read back efficiency, gives a high S/N ratio and enables a GMR head to fly at a flying height of 0.1 $\mu$m or less, a process for producing the same, and a small-sized, large capacity magnetic recording system which uses the medium can be provided.

We claim:

1. A magnetic recording medium for use with a magnetic head, the magnetic head being for recording signals on the magnetic recording medium in a magnetic head travel direction and/or reading recorded signals from the magnetic recording medium in the magnetic head travel direction, the magnetic head travel direction being a direction the magnetic head travels relative to the magnetic recording medium during recording and/or reading as a result of relative motion occurring between the magnetic head and the magnetic recording medium, the magnetic recording medium comprising:

a non-magnetic substrate; and a magnetic layer provided on the non-magnetic substrate;

wherein the value of the product $Br_1\delta$ of the residual flux density $Br_1$ of the magnetic layer determined in the magnetic head travel direction and the thickness $\delta$ of the magnetic layer is not less than 5 G$\mu$m and not more than 180 G$\mu$m;

wherein the value of the ratio of $Br_1$ to the residual flux density $Br_2$ determined in a direction parallel to the substrate plane and perpendicular to the magnetic head travel direction, $Br_1/Br_2$, is not less than 1.3 and not more than 3;

wherein the surface of the non-magnetic substrate has texture grooves therein; and wherein the average roughness factor Ra of the surface of the magnetic layer determined in a direction perpendicular to the substrate plane and perpendicular to the magnetic head travel direction is not less than 0.3 nm and not more than 1.9 nm.

2. The magnetic recording medium according to claim 1, wherein the thickness $\delta$ of the magnetic layer is not less than 5 nm and not more than 60 nm and the coercivity of the magnetic layer is not less than 1800 Oe and not more than 3500 Oe.

3. The magnetic recording medium according to claim 1, further comprising at least one protective layer provided on the magnetic layer.

4. The magnetic recording medium according to claim 3, wherein the average roughness factor Ra of the surface of the protective layer determined in a direction perpendicular to the substrate plane and perpendicular to the magnetic head travel direction is not less than 0.3 nm and not more than 3 nm.

5. The magnetic recording medium according to claim 3, wherein the surface of the protective layer has a larger surface roughness than the surface of the magnetic layer.

6. The magnetic recording medium according to claim 1, wherein the value of the average density N of the grooves in a distance of 1 μm in a direction parallel to the substrate plane and perpendicular to the magnetic head travel direction is not less than 0.3 and not more than 100.

7. The magnetic recording medium according to claim 6, wherein the grooves have a depth of not less than 1 nm and not more than 50 nm.

8. The magnetic recording medium according to claim 1, further comprising a metallic underlayer provided between the non-magnetic substrate and the magnetic layer so as to adjoin at least the magnetic layer.

9. The magnetic recording medium according to claim 8, wherein the metallic underlayer includes at least one metal selected from the group of metals consisting of Cr, Mo, W, Nb, and Ta, or an alloy including at least one metal selected from this group of metals, and has a thickness of not less than 5 nm and not more than 500 nm.

10. The magnetic recording medium according to claim 8, wherein the metallic underlayer is composed of at least two layers of film, the film of the substrate side including at least one material selected from the group of materials consisting of Zr, Si, Ti, Sc, Al, C, Ge, Sb, Ga, Ru, Pd, V, Nb, Hf, Rh, Ni—P, and Ni—B, or an alloy including at least one material selected from this group of materials.

11. The magnetic recording medium according to claim 10, wherein the magnetic layer side film of the two layers of film includes at least one metal selected from the group of metals consisting of Cr, Mo, W, Nb, and Ta, or an alloy including at least one metal selected from this group of metals.

12. The magnetic recording medium according to claim 1, wherein the magnetic layer is composed of plural films, between respective two of which films is provided a non-magnetic intermediate layer including at least one material selected from the group of materials consisting of Cr, Mo, W, V, Ta, Nb, Zr, Ti, B, Be, C, Ni—P, and Ni—B, the intermediate layer having a film thickness of not less than 0.5 nm and not more than 5 nm.

13. The magnetic recording medium according to claim 1, wherein the axis of easy magnetization of the magnetic layer is oriented substantially in the substrate plane direction.

14. The magnetic recording medium according to claim 13, wherein the magnetic layer has a hexagonal structure and the axis of easy magnetization of the magnetic layer is the c-axis of the magnetic layer.

15. The magnetic recording medium according to claim 1, wherein the magnetic layer includes a Co—Cr—Ta alloy, a Co—Cr—Ni alloy, a Co—Cr—Pt alloy, a Co—Ni—Zr alloy, a Co—Ni—Pt alloy, or a Co—Cr—Pt—Si alloy.

16. A process for producing the magnetic recording medium according to claim 1, the process comprising:
   a first step of preparing a non-magnetic substrate;
   a second step of plasma-etching the non-magnetic substrate by using argon gas; and
   a third step of forming a magnetic layer on the non-magnetic substrate.

17. The process for producing a magnetic recording medium according to claim 16, wherein the second step is conducted under the condition of a plasma output density of not less than 30 mW/cm$^2$ and not more than 1,000 mW/cm$^2$.

18. The process for producing a magnetic recording medium according to claim 16, wherein the second step is conducted by using a high frequency plasma.

19. The process for producing a magnetic recording medium according to claim 16, wherein the third step is conducted under application of a negative bias voltage of not less than 10 V and not more than 500 V to the non-magnetic substrate.

20. The process for producing a magnetic recording medium according to claim 16, further comprising a step of forming a metallic underlayer on the non-magnetic substrate after the second step but before the third step.

21. The process for producing a magnetic recording medium according to claim 20, wherein the step of forming a metallic underlayer is conducted under application of a negative bias voltage of not less than 10 V and not more than 500 V to the non-magnetic substrate.

22. A magnetic recording system comprising:
   at least one magnetic recording medium;
   a magnetic recording medium driving part for driving the at least one magnetic recording medium;
   at least one magnetic head for recording signals on the at least one magnetic recording medium in a magnetic head travel direction and/or reading recorded signals from the at least one magnetic recording medium in the magnetic head travel direction, the magnetic head travel direction being a direction the at least one magnetic head travels relative to the at least one magnetic recording medium during recording and/or reading as a result of relative motion occurring between the at least one magnetic head and the at least one magnetic recording medium, the relative motion occurring as a result of the at least one magnetic recording medium being driven by the magnetic recording medium driving part;
   at least one magnetic head driving part for driving the at least one magnetic head in a direction substantially perpendicular to the magnetic head travel direction; and
   a read/write signal processing system for processing the signals recorded on and/or read from the at least one magnetic recording medium;
   wherein each of the at least one magnetic head has a magnetoresistive reading part;
   wherein the magnetic recording medium driving part drives the at least one magnetic recording medium so as to control the flying height of each of the at least one magnetic head to a range of not less than 0.02 μm and not more than 0.1 μm depending on the characteristic properties of each of the at least one magnetic head; and
   wherein each of the at least one magnetic recording medium is the magnetic recording medium according to claim 1.

23. The magnetic recording system according to claim 22, wherein the read/write signal processing system controls a linear recording density of each of the at least one magnetic recording medium to a range of not less than 100 kBPI and not more than 300 kBPI.

24. The magnetic recording system according to claim 23, wherein the read/write signal processing system controls a recording track density of each of the at least one magnetic recording medium to a range of not less than 3.5 kTPI and not more than 30 kTPI.

25. The magnetic recording system according to claim 22, wherein the non-magnetic substrate is a non-magnetic substrate which has been subjected to plasma etching using argon gas.

26. The magnetic recording medium according to claim 1, wherein the non-magnetic substrate is a non-magnetic substrate which has been subjected to plasma etching using argon gas.

27. The magnetic recording medium according to claim 1, wherein the texture grooves in the surface of the non-magnetic substrate extend predominantly in substantially the magnetic head travel direction.

28. A magnetic recording medium for use with a magnetic head, the magnetic head being for recording signals on the magnetic recording medium in a magnetic head travel direction and/or reading recorded signals from the magnetic recording medium in the magnetic head travel direction, the magnetic head travel direction being a direction the magnetic head travels relative to the magnetic recording medium during recording and/or reading as a result of relative motion occurring between the magnetic head and the magnetic recording medium, the magnetic recording medium comprising:

a non-magnetic disk substrate; and a magnetic layer formed on the non-magnetic substrate directly or via at least one underlayer placed therebetween;

wherein the value of the product $Br\delta$ of the residual flux density Br of the magnetic layer determined in the magnetic head travel direction and the thickness $\delta$ of the magnetic layer is not less than 5 G$\mu$m and not more than 80 G$\mu$m; and wherein the value of the anisotropic magnetic field $H_k$ of the magnetic recording medium is not less than 7 kOe and not more than 20 kOe.

29. The magnetic recording medium according to claim 28, wherein the value of $Br\delta$ is not less than 5 G$\mu$m and not more than 30 G$\mu$m.

30. The magnetic recording medium according to claim 28, wherein the coercivity is not less than 1000 Oe and not more than 3500 Oe.

31. The magnetic recording medium according to claim 28, wherein the grain separation of the magnetic layer crystal is not less than 0.5 nm and not more than 5 nm.

32. The magnetic recording medium according to claim 28, wherein the magnetic layer substantially has a hexagonal crystal structure;

wherein the c-axis of the magnetic layer is oriented substantially in the substrate plane direction; and wherein the value of the ratio c/a of the length of c to the length of a of the lattice constant of the hexagonal system is not less than 1.3 and not more than 1.6.

33. The magnetic recording medium according to claim 28, wherein the magnetic layer substantially has a hexagonal crystal structure; and wherein the magnetic layer crystal contains stacking faults caused by face centered cubic lattice regions in the magnetic layer crystal, the stacking fault density being not more the 5%.

34. The magnetic recording medium according to claim 28, wherein at least one element selected from the group of elements consisting of Ar, Xe, and Kr is present in the magnetic layer and/or the underlayer in an atomic concentration of not less than 0.01% and not more than 5%.

35. The magnetic recording medium according to claim 28, wherein the magnetic layer is constructed as a multilayer structure of two or more magnetic film layers, and at least one non-magnetic intermediate layer separating the magnetic film layers from each other; and wherein each of the at least one non-magnetic intermediate layer includes at least one material selected from the group of materials consisting of Cr, Mo, W, V, Ta, Nb, Zr, Ti, B, Be, C, Ni—P, and Ni—B, and has a layer thickness of not less than 0.5 nm and not more than 5 nm.

36. The magnetic recording medium according to claim 28, wherein the average roughness factor Ra of the magnetic layer surface determined in a direction perpendicular to the substrate plane and perpendicular to the magnetic head travel direction is not less than 0.3 nm and not more than 1.9 nm.

37. The magnetic recording medium according to claim 28, further comprising at least one protective layer provided on the magnetic layer;

wherein the surface of the protective layer has a larger surface roughness than the magnetic layer surface.

38. The magnetic recording medium according to claim 28, wherein the average roughness factor Ra of the protective layer surface determined in a direction perpendicular to the substrate plane and perpendicular to the magnetic head travel direction is not less than 0.3 nm and not more than 3 nm.

39. The magnetic recording medium according to claim 28, wherein the underlayer is an alloy underlayer including Cr, Mo, W, Nb, or Ta and at least one material selected from the group of materials consisting of Ti, Pt, Pd, Si, Fe, V, Ru, P, and B, the alloy underlayer being formed between the non-magnetic substrate and the magnetic layer so as to adjoin the magnetic layer, the alloy underlayer having a thickness of not less than 5 nm and not more than 500 nm.

40. The magnetic recording medium according to claim 28, wherein the underlayer is composed of at least two non-magnetic layers; and wherein the substrate side underlayer is formed of at least one material selected from the group of materials consisting of Zr, Si, Ti, Sc, Al, C, Ge, Sb, Ga, Ru, Pd, V, Nb, Ta, Hf, Rh, Ni—P, and Ni—B, or an alloy including at least one material selected from this group of materials.

41. The magnetic recording medium according to claim 28, wherein the magnetic layer includes a Co—Cr—Ta base alloy, a Co—Cr—Ni base alloy, or a Co—Cr—Pt base alloy.

42. The magnetic recording medium according to claim 28, wherein the substrate includes an Al—Mg alloy, chemically strengthened glass, organic resin, Ti, Si, C, or a ceramic such as $TiO_2$ and SiC.

43. A process for producing the magnetic recording medium according to claim 28, the process comprising the step of:

forming a magnetic layer on a non-magnetic disk substrate by means of sputtering while a negative bias voltage of not less than 10 V and not more than 500 V is applied to the non-magnetic disk substrate.

44. A process for producing the magnetic recording medium according to claim 28, the process comprising:

a first step of forming an underlayer including a non-magnetic material on a non-magnetic disk substrate by means of sputtering; and a second step of forming a magnetic layer on the underlayer formed in the first step by means of sputtering;

wherein a negative bias voltage of not less than 10 V and not more than 500 V is applied to the non-magnetic substrate in the first step and the second step.

45. A magnetic recording system comprising:

at least one magnetic recording medium according to claim 28;

magnetic recording medium driving means for driving the at least one magnetic recording medium;

at least one magnetic head for recording signals on the at least one magnetic recording medium in a magnetic head travel direction and/or reading recorded signals from the at least one magnetic recording medium in the magnetic head travel direction, the magnetic head travel direction being a direction the at least one magnetic head travels relative to the at least one magnetic recording medium during recording and/or reading as a result of relative motion occurring between the at least one magnetic head and the at least one magnetic recording medium, the relative motion occurring as a result of the at least one magnetic recording medium being driven by the magnetic recording medium driving part, each of the at least one magnetic head having a giant magnetoresistive effect sensor serving as reading means;

at least one magnetic head driving means for driving the at least one magnetic head in a direction substantially perpendicular to the magnetic head travel direction; and at least one read/write signal processing means for processing the signals recorded on and/or read from the at least one magnetic recording medium;

wherein the flying height of each of the at least one magnetic head is not more than 0.1 µm.

46. The magnetic recording system according to claim 45, wherein a linear recording density of each of the at least one magnetic recording medium is not less than 150 kBPI.

47. The magnetic recording system according to claim 45, wherein a recording track density of each of the at least one magnetic recording medium is not less than 10 kTPI.

48. The magnetic recording system according to claim 45, wherein the magnetic layer is a sputtered magnetic layer formed on the non-magnetic substrate directly.

49. The magnetic recording system according to claim 45, further comprising a sputtered underlayer formed on the non-magnetic substrate;

wherein the magnetic layer is a sputtered magnetic layer formed on the sputtered underlayer.

50. A magnetic recording system comprising:

the magnetic recording medium according to claim 28;

magnetic recording medium driving means for driving the magnetic recording medium;

at least one magnetic head for recording signals on the magnetic recording medium in a magnetic head travel direction and/or reading recorded signals from the magnetic recording medium in the magnetic head travel direction, the magnetic head travel direction being a direction the at least one magnetic head travels relative to the at least one magnetic recording medium during recording and/or reading as a result of relative motion occurring between the at least one magnetic head and the at least one magnetic recording medium, the relative motion occurring as a result of the at least one magnetic recording medium being driven by the magnetic recording medium driving part, each of the at least one magnetic head having a magnetic recording/reading part;

at least one magnetic head driving means for driving the magnetic head in a direction substantially perpendicular to the magnetic head travel direction; and at least one read/write signal processing means for processing the signals recorded on and/or read from the magnetic recording medium.

51. The magnetic recording medium according to claim 28, wherein the magnetic layer is a sputtered magnetic layer formed on the non-magnetic substrate directly.

52. The magnetic recording medium according to claim 28, further comprising a sputtered underlayer formed on the non-magnetic substrate;

wherein the magnetic layer is a sputtered magnetic layer formed on the sputtered underlayer.

53. A disk-shaped magnetic recording medium for use with a magnetic head, the magnetic head being for recording signals on the magnetic recording medium in a circumferential direction of the magnetic recording medium and/or reading recorded signals from the magnetic recording medium in the circumferential direction, the magnetic recording medium comprising:

a non-magnetic substrate; and a magnetic layer provided on the non-magnetic substrate;

wherein the value of the product $Br_1\delta$ of the residual flux density $Br_1$ of the magnetic layer determined in the circumferential direction and the thickness $\delta$ of the magnetic layer is not less than 5 G$\mu$m and not more than 180 G$\mu$m;

wherein the value of the ratio of $Br_1$ to the residual flux density $Br_2$ determined in a direction parallel to the substrate plane and perpendicular to the circumferential direction, $Br_1/Br_2$, is not less than 1.3 and not more than 3;

wherein the surface of the non-magnetic substrate has texture grooves therein; and wherein the average roughness factor Ra of the surface of the magnetic layer determined in a direction perpendicular to the substrate plane and perpendicular to the circumferential direction is not less than 0.3 nm and not more than 1.9 nm.

54. The disk-shaped magnetic recording medium according to claim 53, wherein the texture grooves in the surface of the non-magnetic substrate extend predominantly in substantially the circumferential direction.

55. The disk-shaped magnetic recording medium according to claim 53, further comprising at least one protective layer provided on the magnetic layer;

wherein the average roughness factor Ra of the surface of the protective layer determined in a direction perpendicular to the substrate plane and perpendicular to the circumferential direction is not less than 0.3 nm and not more than 3 nm.

56. The disk-shaped magnetic recording medium according to claim 53, wherein the value of the average density N of the grooves in a distance of 1 $\mu$m in a direction parallel to the substrate plane and perpendicular to the circumferential direction is not less than 0.3 and not more than 100.

57. A magnetic recording system comprising:

at least one disk-shaped magnetic recording medium;

a magnetic recording medium driving part for driving the at least one magnetic recording medium in a circumferential direction of the at least one magnetic recording medium;

at least one magnetic head for recording signals on the at least one magnetic recording medium in the circumferential direction and/or reading recorded signals from the at least one magnetic recording medium in the circumferential direction;

at least one magnetic head driving part for driving the at least one magnetic head in a direction substantially perpendicular to the circumferential direction; and a read/write signal processing system for processing the signals recorded on and/or read from the at least one magnetic recording medium;

wherein each of the at least one magnetic head has a magnetoresistive reading part;

wherein the magnetic recording medium driving part drives the at least one magnetic recording medium so as to control the flying height of each of the at least one magnetic head to a range of not less than 0.02 μm and not more than 0.1 μm depending on the characteristic properties of each of the at least one magnetic head; and wherein each of the at least one magnetic recording medium is the disk-shaped magnetic recording medium according to claim 53.

58. A disk-shaped magnetic recording medium for use with a magnetic head, the magnetic head being for recording signals on the magnetic recording medium in a circumferential direction of the magnetic recording medium and/or reading recorded signals from the magnetic recording medium in the circumferential direction, the magnetic recording medium comprising:

a non-magnetic disk substrate; and a magnetic layer formed on the non-magnetic substrate directly or via at least one underlayer placed therebetween;

wherein the value of the product Brδ of the residual flux density Br of the magnetic layer determined in the circumferential direction and the thickness δ of the magnetic layer is not less than 5 Gμm and not more than 80 Gμm; and wherein the value of the anisotropic magnetic field $H_k$ of the magnetic recording medium is not less than 7 kOe and not more than 20 kOe.

59. The disk-shaped magnetic recording medium according to claim 58, wherein the average roughness factor Ra of the magnetic layer surface determined in a direction perpendicular to the substrate plane and perpendicular to the circumferential direction is not less than 0.3 nm and not more than 1.9 nm.

60. The disk-shaped magnetic recording medium according to claim 58, wherein the average roughness factor Ra of the protective layer surface determined in a direction perpendicular to the substrate plane and perpendicular to the circumferential direction is not less than 0.3 nm and not more than 3 nm.

61. A magnetic recording system comprising:

at least one disk-shaped magnetic recording medium according to claim 58;

magnetic recording medium driving means for driving the at least one magnetic recording medium in a circumferential direction of the at least one magnetic recording medium;

at least one magnetic head for recording signals on the at least one magnetic recording medium in the circumferential direction and/or reading recorded signals from the at least one magnetic recording medium in the circumferential direction, each of the at least one magnetic head having a giant magnetoresistive effect sensor serving as reading means;

at least one magnetic head driving means for driving the at least one magnetic head in a direction substantially perpendicular to the circumferential direction; and at least one read/write signal processing means for processing the signals recorded on and/or read from the at least one magnetic recording medium;

wherein the flying height of each of the at least one magnetic head is not more than 0.1 μm.

62. A magnetic recording system comprising:

the disk-shaped magnetic recording medium according to claim 58;

magnetic recording medium driving means for driving the magnetic recording medium in a circumferential direction of the magnetic recording medium;

at least one magnetic head for recording signals on the magnetic recording medium in the circumferential direction and/or reading recorded signals from the magnetic recording medium in the circumferential direction, each of the at least one magnetic head having a magnetic recording/reading part;

at least one magnetic head driving means for driving the magnetic head in a direction substantially perpendicular to the circumferential direction; and at least one read/write signal processing means for processing the signals recorded on and/or read from the magnetic recording medium.

* * * * *